(12) United States Patent
McCullough et al.

(10) Patent No.: US 10,467,912 B2
(45) Date of Patent: Nov. 5, 2019

(54) SYSTEM AND METHOD TO REVISE VERTICAL PROFILE OF A FLIGHT PLAN

(71) Applicant: HONEYWELL INTERNATIONAL INC., Morris Plains, NJ (US)

(72) Inventors: Sue McCullough, Phoenix, AZ (US); Mahesh Sivaratri, Karnataka (IN); Sujith Kalarickal, Kerala (IN); Kalimulla Khan, Karnataka (IN); John R, Karnataka (IN); Soumitri Swain, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 242 days.

(21) Appl. No.: 15/458,653

(22) Filed: Mar. 14, 2017

(65) Prior Publication Data
US 2018/0268721 A1  Sep. 20, 2018

(51) Int. Cl.
*G06F 3/048* (2013.01)
*G08G 5/00* (2006.01)
(Continued)

(52) U.S. Cl.
CPC ......... *G08G 5/0039* (2013.01); *G06F 3/0485* (2013.01); *G06F 3/0488* (2013.01);
(Continued)

(58) Field of Classification Search
CPC .. G08G 5/0039; G08G 5/0021; G08G 5/0078; G08G 5/0091; G06F 3/04845;
(Continued)

(56) References Cited

U.S. PATENT DOCUMENTS 6,112,141 A    8/2000   Briffe et al.
6,389,355 B1   5/2002   Gibbs et al.
(Continued)

FOREIGN PATENT DOCUMENTS

EP    2405417 A2   1/2012
EP    2600108 A1   6/2013
EP    2922046 A1   9/2015

OTHER PUBLICATIONS

Extended EP Search Report for Application No. 18161123.7 dated Sep. 10, 2018.

*Primary Examiner* — Andrew T Chiusano
(74) *Attorney, Agent, or Firm* — Lorenz & Kopf, LLP

(57) ABSTRACT

A vehicular situation display including a user interface, a display, and a processor is provided to modify a vertical profile of a flight plan. The processor may generate vertical profile display data on the display based, receive a request to edit the vertical profile, expand the vertical profile display data on the display, generate a first movable reference line corresponding to one of an altitude, a distance and a time, receive, from the user interface, a flight plan change request to change an altitude, distance or time of the flight plan, the altitude, distance or time corresponding to the first movable reference line, generate a preview of an updated flight plan, and transmit the approval of the displayed updated flight plan to a flight management system, the flight management system configured to update the flight plan of the aircraft based upon the command to change the flight plan.

17 Claims, 28 Drawing Sheets

(51) Int. Cl.
   *G06F 3/0484*  (2013.01)
   *G06F 3/0488*  (2013.01)
   *G06F 3/0485*  (2013.01)

(52) U.S. Cl.
   CPC ....... *G06F 3/04845* (2013.01); *G08G 5/0021* (2013.01); *G08G 5/0078* (2013.01); *G08G 5/0086* (2013.01); *G08G 5/0091* (2013.01); *G06F 3/04842* (2013.01); *G06F 2203/04806* (2013.01)

(58) Field of Classification Search
   CPC .. G06F 3/0485; G06F 3/0488; G06F 3/04842; G06F 2203/04806
   See application file for complete search history.

(56) References Cited

U.S. PATENT DOCUMENTS

| | | |
|---|---|---|
| 6,690,298 B1 | 2/2004 | Barber et al. |
| 7,256,710 B2 | 8/2007 | Mumaw et al. |
| 8,793,039 B1 | 7/2014 | Hammack et al. |
| 9,132,913 B1 | 9/2015 | Shapiro et al. |
| 9,352,848 B2 | 5/2016 | Nikolic et al. |
| 2006/0004496 A1* | 1/2006 | Tucker .................. G01C 23/00 701/4 |
| 2006/0238511 A1* | 10/2006 | Gyde ..................... G01C 23/00 345/168 |
| 2011/0010082 A1* | 1/2011 | Wilson .................. G01C 23/00 701/532 |
| 2012/0139778 A1* | 6/2012 | Bunch ...................... G01S 7/04 342/26 B |
| 2012/0253562 A1* | 10/2012 | Wachenheim ....... G08G 5/0034 701/4 |
| 2013/0215023 A1* | 8/2013 | Bourret .................. G06F 3/013 345/157 |
| 2014/0139450 A1* | 5/2014 | Levesque ............... G06F 3/016 345/173 |
| 2014/0365041 A1* | 12/2014 | Deker .................. G05D 1/0607 701/4 |
| 2015/0260525 A1* | 9/2015 | Parthasarathy ........ G01C 23/00 701/538 |
| 2016/0138936 A1* | 5/2016 | He ......................... G01C 21/00 345/680 |
| 2016/0180718 A1 | 6/2016 | Shapiro et al. |

* cited by examiner

SYSTEM AND METHOD TO REVISE VERTICAL PROFILE OF A FLIGHT PLAN

TECHNICAL FIELD

The present disclosure generally relates to aircrafts, and more particularly relates to systems and methods for revising a vertical profile of a flight plan for an aircraft.

BACKGROUND

Flight management systems are used to manage flight plans for a vehicle. Occasionally, restrictions, such as weather, other aircraft traffic, or regulatory restrictions, require a crew member to alter the vertical flight plan of the vehicle. In other words, the crew member must change an altitude or flight path angle at which the aircraft is flying to avoid the restriction. However, traditional methods for altering a flight plan, such as on a multi-control display unit or interactive navigation system (INAV) are complex.

BRIEF SUMMARY

In one embodiment, for example, an aircraft is provided. The aircraft may include, but is not limited to, a flight management system configured to control a flight plan of the vehicle, a sensor configured to output restriction data, a vertical situation display communicatively coupled to the flight management system and the sensor, the vertical situation display configured to display the flight plan controlled by the flight management system relative to altitude and distance and the restriction data from the sensor relative to altitude, the vertical situation display including a processor, and a vertical situation display user interface communicatively coupled to the vertical situation display, wherein the vertical situation display user interface is dialogless and includes at least one of a touch screen interface and a cursor interface, wherein the processor of the vertical situation display is configured to receive, from the vertical situation display user interface, a request to change the flight plan, expand the vertical situation display in a vertical direction and zoom into a position within the vertical situation display upon receiving the request, generate at least one movable reference line on the expanded vertical situation display, the movable reference line extending to a scale of the vertical situation display, the movable reference line being movable to enter a command to change the flight plan of the aircraft, the movable reference line comprising at least one characteristic reflective of an restriction interaction when the aircraft would intersect with the restriction, receive, from the vertical situation display user interface, the command to change the flight plan based upon a movement of one of the movable reference line, the change including at least one of a vertical step command, a vertical direct to command, a revision to an existing altitude constraint of the flight plan command, a new altitude constraint command, a deletion of an altitude constraint command, a flight path angle constraint command, a flight level change command, a time constraint command and a speed constraint command, generate a preview of the updated flight plan display data for the vertical situation display, the generated preview of the updated flight plan display data displaying an updated flight plan relative to a current flight plan from the flight management system and the restriction data from the sensor, receive, from the vertical situation display user interface, approval of the displayed updated flight plan, and transmit the approval of the displayed updated flight plan to the flight management system, the flight management system configured to update the flight plan of the vehicle based upon the command to change the flight plan.

In another embodiment, for example, a situation display for an aircraft is provided. The situation display may include, but is not limited to, a user interface, a display, and a processor communicatively coupled to the user interface and the display, the processor configured to receive, from a sensor, restriction data, receive, from a flight management system, flight plan data, generate lateral profile display data on a first portion of the display based upon the restriction data a lateral profile of the flight plan data, generate vertical profile display data on a second portion of the display based upon the restriction data a vertical profile of the flight plan data, receive, from the user interface, a request to edit a vertical profile of the flight plan, expand the vertical profile display data into the first portion of the display, generate a first movable reference line, the first movable reference line movable via input to the user interface, the first movable reference line corresponding to one of an altitude, a distance and a time and extending along the vertical profile display data to a scale, the first movable reference line comprising at least one visual characteristic which changes based when the first movable reference line overlaps an restriction of the restriction data, receive, from the user interface, a flight plan change request to change an altitude, distance or time of the flight plan, the altitude, distance or time corresponding to the first movable reference line, generate a preview of an updated flight plan based upon the flight plan change request, the generated preview of the updated flight plan displaying the updated flight plan relative to a current flight plan from the flight management system and the restriction data from the sensor, receive, from the user interface, approval of the displayed updated flight plan, and transmit the approval of the displayed updated flight plan to the flight management system, the flight management system configured to update the flight plan of the aircraft based upon the command to change the flight plan.

In another embodiment, for example, a method for operating a vertical situation display is provided. The method may include, but is not limited to, receiving, by a processor, restriction data from a sensor, receiving, by the processor, flight plan data from a flight management system, generating, by the processor, lateral profile display data on a first portion of a display based upon the restriction data a lateral profile of the flight plan data, generating, by the processor, vertical profile display data on a second portion of the display based upon the restriction data a vertical profile of the flight plan data, receiving, by the processor, a request to edit a vertical profile of the flight plan from a user interface associated with the vertical situation display, expanding, by the processor, the vertical profile display data into the first portion of the display, generating, by the processor, a first movable reference line, the first movable reference line movable via input to the user interface, the first movable reference line corresponding to an altitude and extending along the vertical profile display data to an altitude scale, the first movable reference line comprising at least one visual characteristic which changes based when the first movable reference line overlaps an restriction of the restriction data, receiving, by the processor, a flight plan change request to change an altitude of the flight plan from the user interface, the altitude corresponding to the altitude of the first movable reference line, generating, by the processor, a preview of an updated flight plan based upon the flight plan change request, the generated preview of the updated flight plan displaying the updated flight plan relative to a current flight plan from the flight management system and the restriction data from the sensor, receiving, by the processor approval of the displayed updated flight plan from the user interface, and transmitting, by the processor, the approval of the displayed updated flight plan to the flight management system, the flight management system configured to update the flight plan of the aircraft based upon the command to change the flight plan.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A system and method for revising a vertical profile of a flight plan are provided. The system utilizes a situation display to display a vertical profile of a flight plan along with restriction data from one or more sensors or other systems. As discussed in greater detail below, a user may manipulate the flight plan of the vehicle directly in the situation display, giving the user a better appreciation of how a new flight plan instruction will interact with restrictions in the flight plan than traditional flight plan modification tools.

Figure 1:
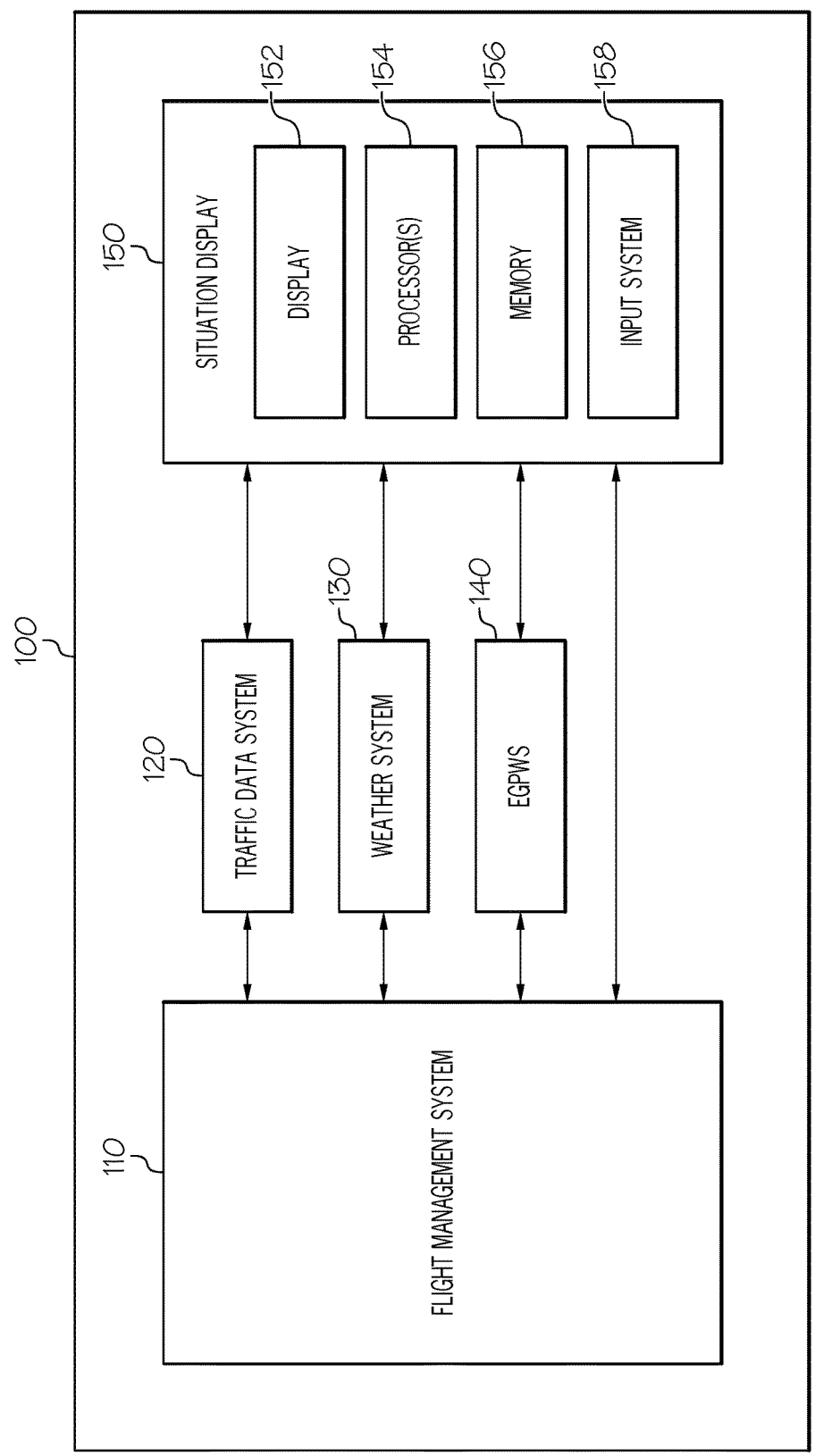
FIG. 1 illustrates an exemplary vehicle, in accordance with an embodiment.

FIG. 1 illustrates an exemplary vehicle 100, in accordance with an embodiment. The vehicle 100 may be, for example, an aircraft, a spacecraft, a helicopter, a drone, or any other vehicle which is capable of flight. The vehicle 100 includes a flight management system (FMS) 110. The FMS 110 is a fundamental component of a modern airliner's avionics. An FMS is a specialized computer system that automates a wide variety of in-flight tasks, reducing the workload on the flight crew. A primary function is in-flight management of the flight plan. Using data received from a global positioning system (not illustrated) to determine the position of the vehicle 100, the FMS 110 may guide the vehicle along the flight plan.

The FMS 110 may be communicatively coupled, via one or more communication buses, to a Traffic Data System (TDS) 120, a weather system 130 and an Enhanced Ground Proximity Warning System (EGPWS) 140. The TDS 120 tracks traffic of other vehicles in proximity to the vehicle 100. Likewise, the weather system tracks the weather in the proximity of the vehicle 100. The EGPWS 140 maintains a terrain database (e.g., the location of mountains) for use in the navigation of the vehicle 100.

The vehicle 100 further includes a situation display system 150. The situation display system 150 receives data from the FMS 110, TDS 120, weather system 130 and EGPWS 140 via one or more data busses. As discussed in greater detail below, the situation display system 150 displays a lateral and vertical profile of the flight plan of the vehicle 100 in relation to restriction data received from the TDS 120, weather system 130 and EGPWS 140. In one embodiment, for example, the situation display system 150 may be mounted within a cockpit of the vehicle 100. However, the situation display system 150 could be implemented on a portable device which is carried into the vehicle 100, such as a tablet, a laptop or the like. The situation display system 150 allows the pilot or other operator within the vehicle 100 the ability to edit the flight plan within the vertical profile display. One benefit of the situation display system 150 is that the editing tools, described in greater detail below, are dialogless. In other words, unlike the traditional branch and leaf style menu based system for editing the flight plan on a INAV or a multi-control display unit (MCDU), the situation display system 150 utilizes simple intuitive inputs to edit the flight plan without the complex menus.

The situation display system 150 includes a display 152. The display 152 may be dedicated to the situation display system 150 or may be shared by one or more other components within the vehicle 100. The display 152 may be a cathode ray tube (CRT) display, a liquid crystal display (LCD), a light emitting diode (LED) display, a plasma display, or the like.

Figure 2:
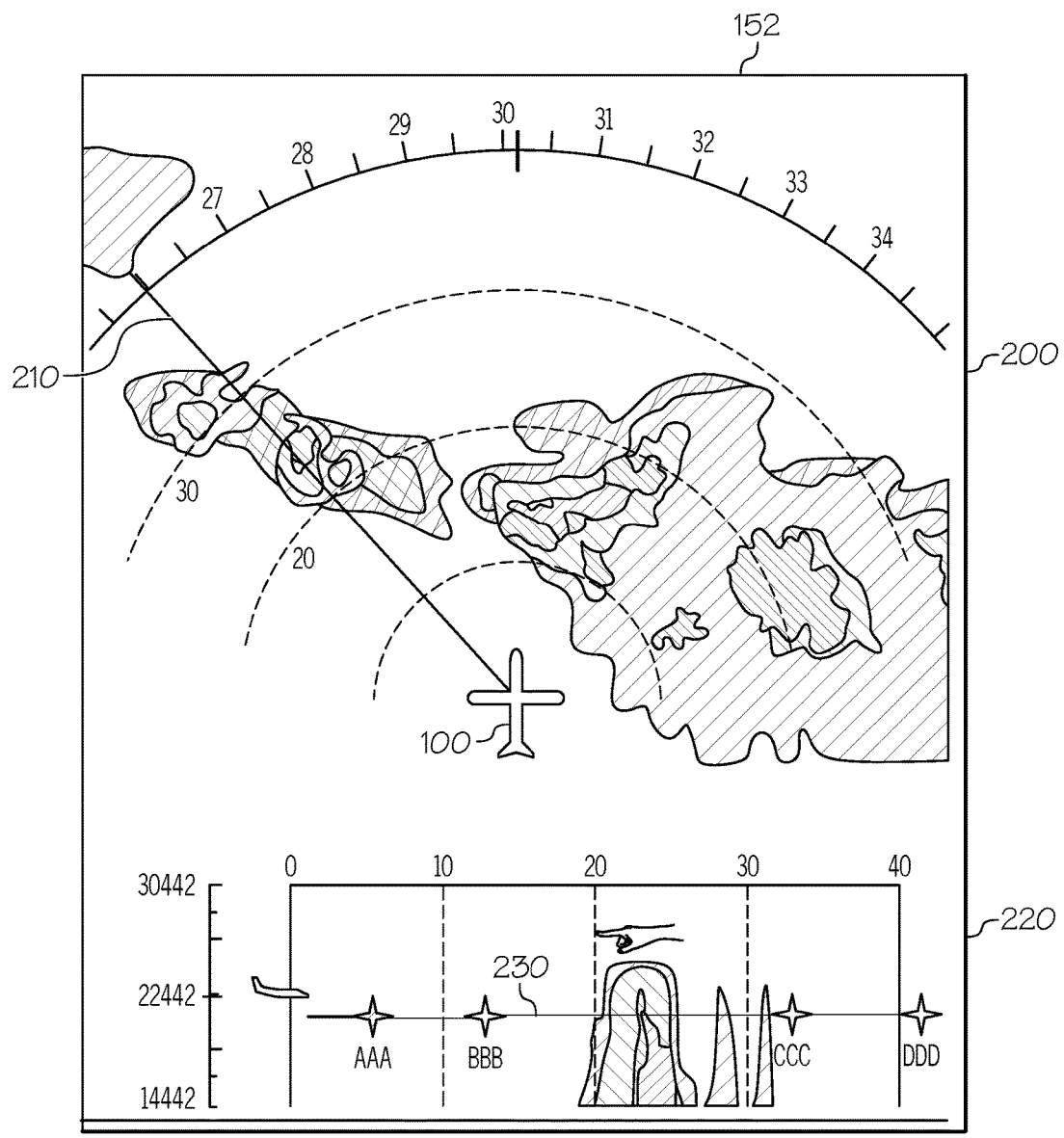
FIG. 2 illustrates an exemplary display of the situation display system.

FIG. 2 illustrates an exemplary display 152 of the situation display system 150. As seen in FIG. 2, the upper portion of the display 152 includes a lateral display 200 illustrating a lateral profile of the flight plan 210 of the vehicle 100, therein illustrated as an aircraft. As seen in FIG. 2, the lateral display 200 shows the lateral profile of the flight plan 210 as a line representing a heading of the vehicle 100 and also illustrates restrictions within a path of the flight plan as well as restrictions within the vicinity of the vehicle 100. The restrictions may be vehicle performance constraints such as maximum certified altitude, operational altitude envelopes, or the like, regulatory constraints such as ICAO flight levels, traffic congestions, safety altitude limits, or the like, flight plan restrictions such as downpath altitude, speed, time constraints, or the like, and/or environmental obstacles such as weather, traffic, terrain, or the like. The restrictions may be based upon data from the TDS 120, weather events received from the weather system 130, and/or ground elements (e.g., mountains, building's, etc.) from the EGPWS 140, or regulatory restrictions such as restricted airspace or aircraft operation restrictions stored in the FMS 110. In the exemplary screen shot illustrated in FIG. 2, a weather system is displayed with the various shades representing different intensities of the weather event.

The lower portion of the display includes a vertical display 220 illustrating a vertical profile of the flight plan 230 of the vehicle 100. As seen in FIG. 2, the vertical profile of the flight plan 230 of the vehicle 100 is illustrated as a line. Like the lateral display 200, the vertical display 220 may also show restrictions along the flight plan as well as restrictions within the vicinity of the vehicle 100. The restrictions may be other vehicles received from data from the TDS 120, weather events received from the weather system 130, and/or ground elements (e.g., mountains, building's, etc.) from the EGPWS 140. As with the lateral display 200, the weather system is displayed with the various shades representing different intensities of the weather event. The vertical axis within the vertical display 220 corresponds to an altitude of the vehicle 100. The horizontal axis within the vertical display 220 corresponds to a distance in nautical miles from the current location of the vehicle 100.

Returning to FIG. 1, the situation display 150 includes one or more processors 154. The processor(s) 154 may be a central processing unit (CPU), a graphics processing unit (GPU), an application specific integrated circuit (ASIC), a field programmable gate array (FPGA), a microcontroller, or any other logic device or combination thereof. While FIG. 1 illustrates the processor(s) 154 as being part of the situation display system 150, the processor(s) 154 may be located in any portion of the vehicle 100 and may be dedicated to the situation display system 150 or shared by one or more other systems of the vehicle 100. The processor(s) 154 is coupled to the display 152 and to the FMS 110, TDS 120, weather system 130 and EGPWS 140 via one or more data bussed.

The situation display 150 further includes a memory 156 coupled to the processor 154 via a data bus. The memory 156 may be any combination of volatile and non-volatile memory. The memory 156 may be any non-transitory computer readable medium storing instructions, which when implemented by a processor, cause the processor to implement the situation display as discussed herein.

The situation display 150 also includes an input system 158. While FIG. 1 illustrates the input system 158 as being part of the situation display system 150, the input system 158 could be located anywhere within the vehicle 100 and may be dedicated to the situation display 150 or shared by one or more other systems within the vehicle 100. The input system 158 may be a touch screen, a cursor based system (e.g., a trackball, a mouse, a touch pad, or the like), a microphone (i.e., for voice commands), a keyboard, button, knobs, or the like, or any combination thereof. The input system 158 can be utilized by a user of the vehicle 100 to alter the flight plan of the vehicle through the situation display 150, as discussed in further detail below.

Figure 3:
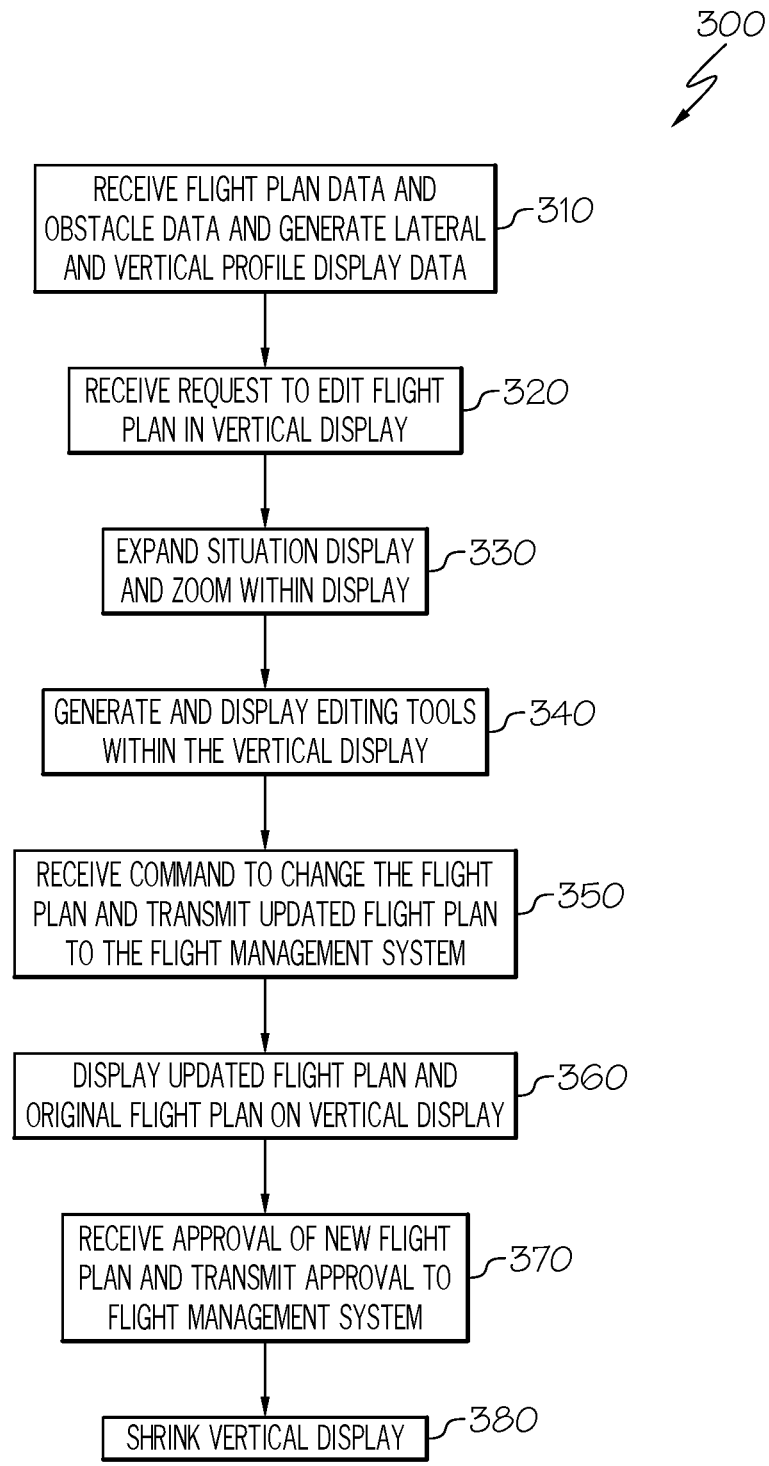
FIG. 3 is a flow diagram illustrating a method for operating the situation display, in accordance with an embodiment.

FIG. 3 is a flow diagram illustrating a method 300 for operating the situation display 150, in accordance with an embodiment. The processor 154 of the situation display receives flight plan data from the FMS 110 and restriction data from the TDS 120, weather system 130 and EGPWS 140 and generates lateral profile display data for display in the lateral display 200 and vertical profile display data for the flight plan in the vertical display 220 as seen, for example, in FIG. 2. (Step 310). The lateral profile display data includes the lateral profile of the flight plan as well as any restriction data from the various aircraft system discussed above. Likewise, the vertical profile display data includes the vertical profile of the flight plan as well as any restriction data from the various aircraft system discussed above.

The processor 154 of the situation display 150 continuously updates the lateral profile display data and vertical profile display data until the processor 154 determines that a request to edit the flight plan of the vehicle has been received in the vertical display 220 of the situation display 150. (Step 320). The processor 154 may determine that a request has been received when a user utilizes the input system 158 within the vertical display 220 of the situation display 150. For example, when the input system 158 is a touch screen, the user may request to edit the flight plan by touching anywhere within the vertical display 220 of the situation display 150. Likewise, when the input system is a cursor based system, the user can request to edit the flight plan by, for example, moving the cursor within the vertical display 220, clicking anywhere within the vertical display 220, or the like. In another embodiment, for example, a editing request button could be generated by the processor 154 and displayed on the vertical display 220 of the situation display 150.

In one embodiment, for example, the processor 154 may determine where on the vertical display 220 of the situation display 150 the request was received. As discussed in further detail below, the position of the request may be used to zoom into an area of the vertical display 220 where the editing may occur. The determined position of the request may be determined in a variety of ways, depending upon the type of input system 158 which was used.

Figure 4:
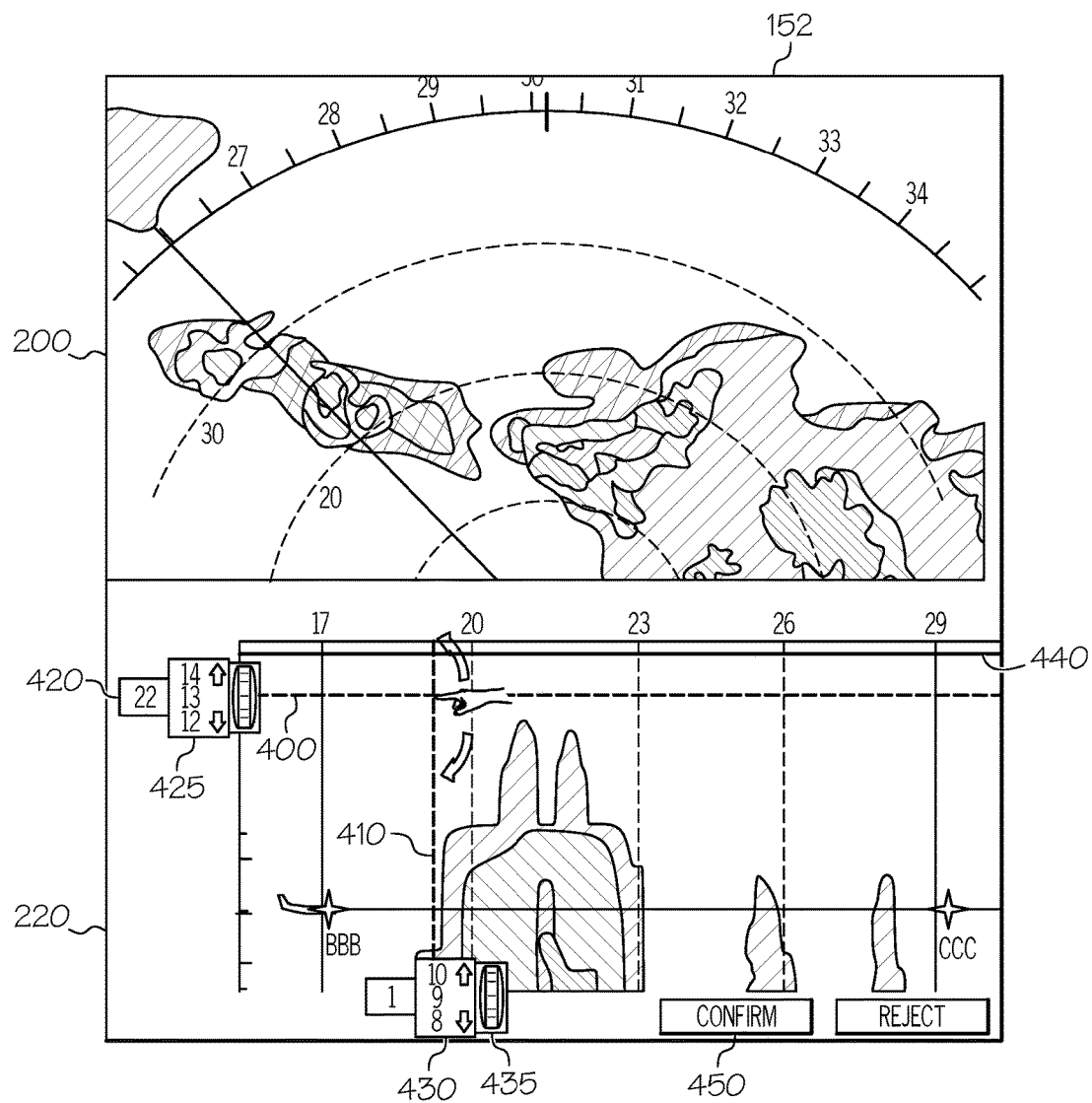
FIG. 4 illustrates another exemplary display of the situation display system.

The processor 154 then expands the vertical display 220 within the situation display 150 and may zoom within the display when a specific portion of the vertical display 220 is selected by a user. (Step 330). As seen in FIG. 2, the vertical display 220 is a relatively small portion of the of the situation display 150, around, for example, one third of the available display. Accordingly, the processor 154 expands the vertical display 220 in the vertical direction into a portion of the display 152 previously displaying the lateral display 200. FIG. 4 illustrates another exemplary display 152 of the situation display system 150. As seen in FIG. 4, the vertical display 220 has been expended to cover a portion of the lateral display 200, covering approximately one half of the display 152. However, the vertical display could be expanded to cover the entire display 152 or any portion thereof. By expanding the vertical display 220, the situation display system 150 allows for more room for editing the flight plan of the vehicle 100.

As discussed above, the processor 154 may also zoom within the expanded vertical display 220. In other words, rather than just enlarging the entire vertical display illustrated in FIG. 2, the processor 154 may also zoom in on a portion of the display data displayed within the vertical display 220.

A user may, for example, touch and hold a space in the vertical display 220 on which editing has to be performed. In response, the processor 154 generates instructions to expand the vertical display 220 centering to the touch point. Editing tools, as discussed in further detail below, may also be centered at the touch point in this example. In another embodiment, for example, a user can touch and hold a waypoint displayed on the vertical display 220. The waypoint is a point of interest associated with at least one of an altitude constraint, a time constraint, an angle constraint, a altitude marker, a time marker, or the like. The processor 154 with then expand the vertical display 220 area centering to that selected waypoint and generate editing tools for the waypoint centered on the selected waypoint. In these examples, the processor 154 may zoom in around the touch point or selected waypoint. The scale on both the axis will be adjusted with reference to the centered space or waypoint based on the current elevation of the aircraft, flight phase, maximum certified altitude and the distance to destination.

Figure 5:
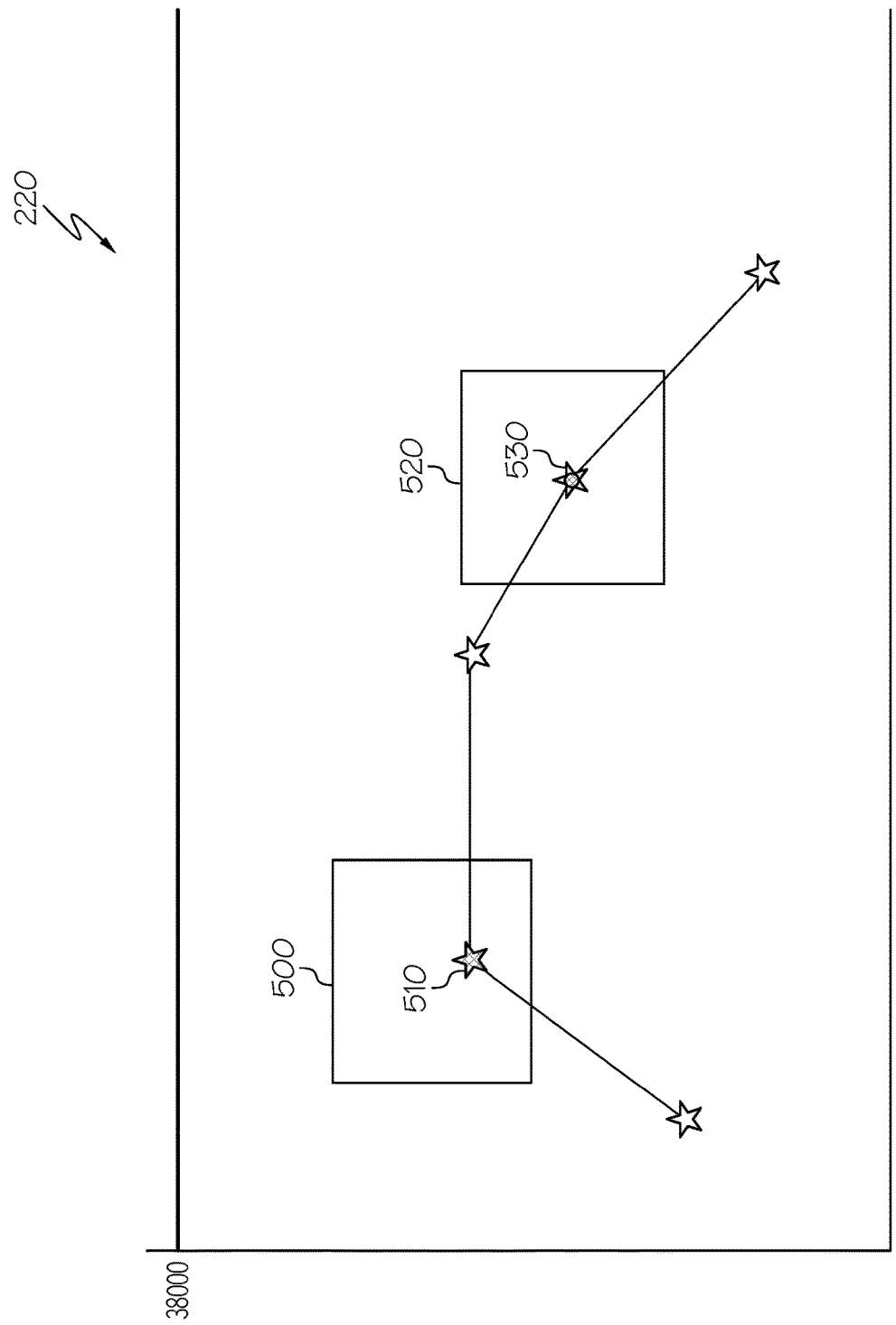
FIG. 5 illustrates two examples for determining the zooming parameters, in accordance with an embodiment.

FIG. 5 illustrates two examples for determining the zooming parameters, in accordance with an embodiment. In example 1, labeled 500 in FIG. 5, an aircraft is in cruise flight phase and maximum certified altitude for that aircraft is 38000 feet. In this example, a user may select waypoint 510. Assuming the aircraft and is at 35000 feet, the processor may set the upper limit of the zoomed area in the expanded vertical display 220 to 38000 feet and the left side of the zoomed area in the expanded vertical display 220 may be set to the current aircraft distance. The lower limit & right side of the zoomed area in the expanded vertical display 220 area will be set according to the maximum amount displayable given the preset boundaries for the left side and upper side.

In the second example, labeled 520, a destination of the vehicle is at 3000 feet and the selected waypoint 530 is close to the destination and at an elevation of 5000 feet and ten nautical miles from the destination. In this example, the processor 154 may set then the lower limit of the zoomed area in the expanded vertical display 220 to 5000 feet and the right side of the zoomed area in the expanded vertical display 220 will be set to the distance to destination. The upper limit & left side of the zoomed area in the expanded vertical display 220 will be adjusted accordingly to the maximum viewable area give the other parameters.

Returning to FIG. 3, the processor 154 then generates editing tools with the vertical display 220. (Step 340). The editing tools include at least one movable reference line, each reference line corresponding to an axis displayed in the vertical display 220. As seen in the embodiment illustrated in FIG. 4 which includes multiple reference lines, a movable reference line 400 corresponds to an altitude and a movable reference line 410 corresponds to a "distance to go" from the vehicle 100. Each of the movable reference lines 400 and 410 can be moved by a user of the vehicle 100 via the input system 158. For example, when the input system 158 is a touch screen, a user can move the reference line by dragging the reference line 400 or 410 on the vertical display. As discussed in further detail below, the intersection of the reference lines 400 and 410 can be used as an input to alter the flight plan of the vehicle 100. One benefit of the reference lines 400 and 410 is that they clearly illustrate how vehicle 100 will interact with the restrictions displayed on the vertical display 220. In other words, a user can easily determine an optimal placement for an instruction to change to the flight plan as the user can see the restriction data in the same display (i.e., the situation display 150) as the reference lines 400 and 410 used to enter the flight plan change instruction. As seen in FIG. 4, for example, the movable reference line 400 has been placed above any of the restrictions, and, thus shows that a change of the flight plan to the altitude corresponding to the reference line 400 will clear the restriction. Likewise, the movable reference line 410 clearly illustrates where a new waypoint would be located relative to the restriction such that a user can easily select the distance from the vehicle at which a new waypoint could be located which easily avoids the restriction.

Figure 6:
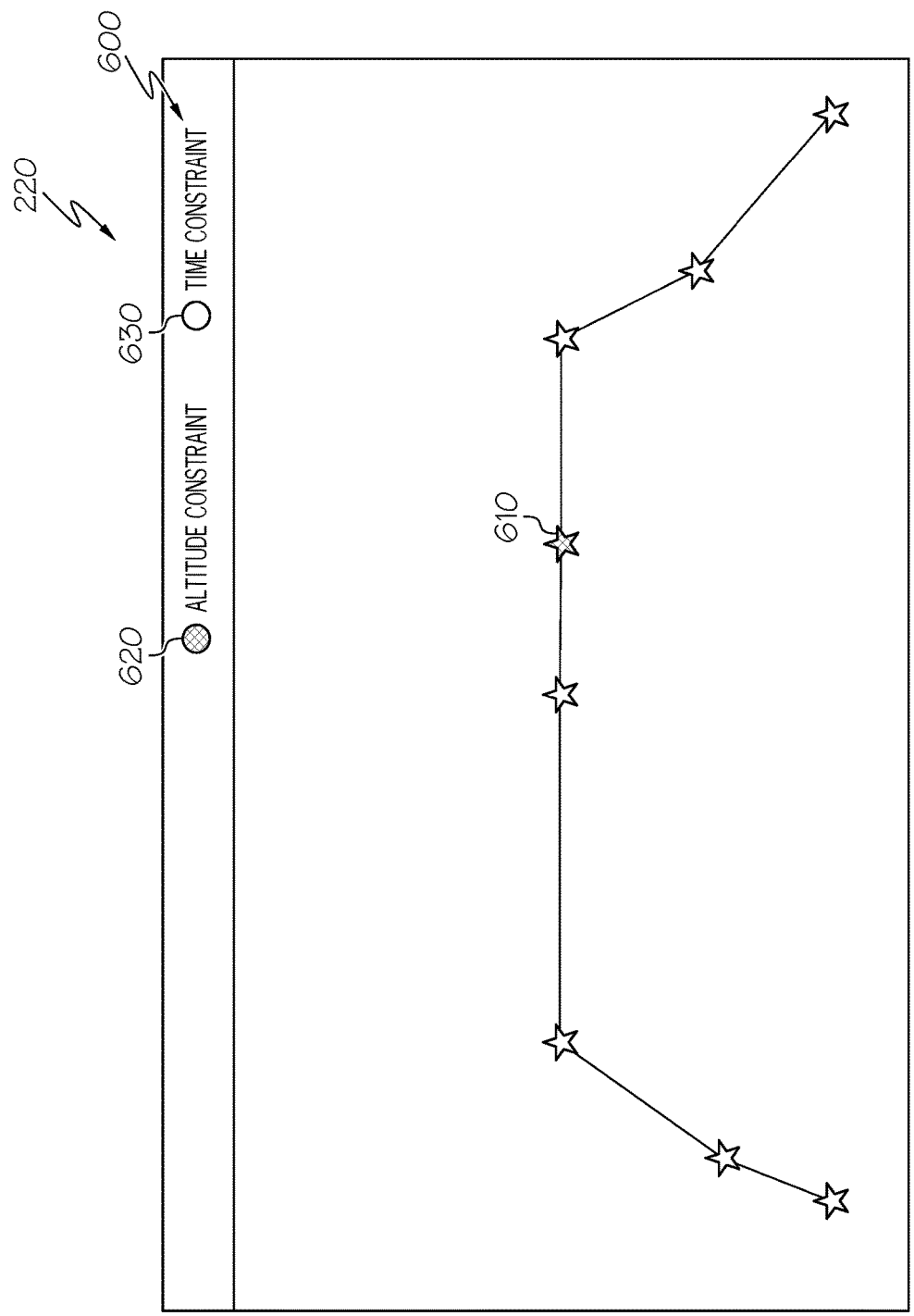
FIG. 6 illustrates an exemplary vertical display having an editing interface 600, in accordance with an embodiment.

The particular editing tools which are generated by the processor 154, however, may depend upon a user selected editing mode. In one embodiment for example, when a waypoint is selected in the vertical display 220, the options for editing the waypoint may be displayed in a editing interface. The options may include, for example, a time constraint, a speed constraint, an angle constraint, an altitude constraint, or the like. FIG. 6 illustrates an exemplary vertical display having an editing interface 600, in accordance with an embodiment. In this exemplary interface, when the waypoint 610 is selected, the options for an altitude constraint and a time constraint are showing in the editing interface 600. However, the processor 154 may generate any number of editing options which are available for any particular waypoint based upon the flight phase (climb, cruise or decent), and the location of the waypoint. In this embodiment, radio buttons 620 and 630 allow for the selection of one of the available editing modes. However, a variety of selection interfaces could be utilized.

Figure 7:
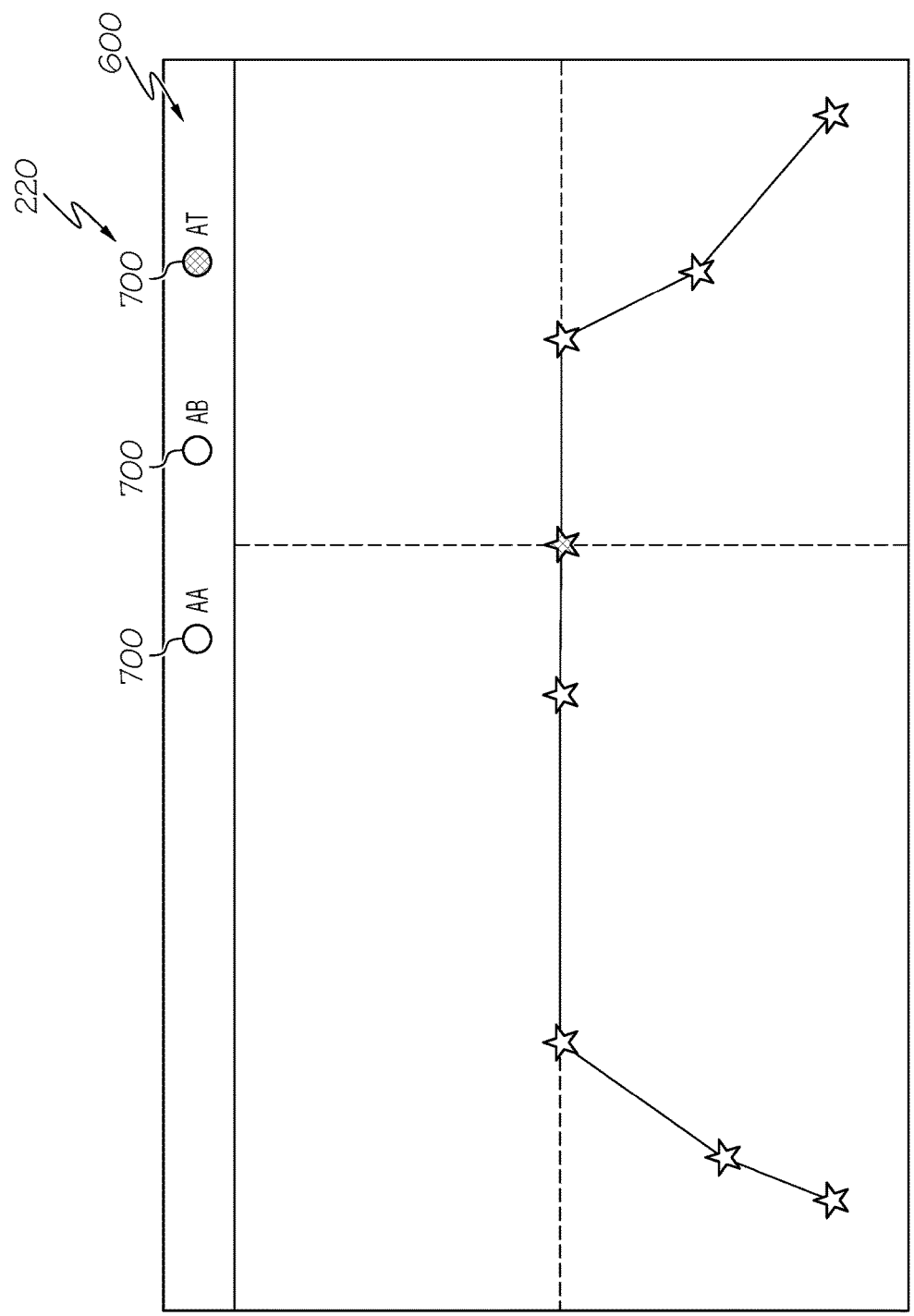
FIG. 7 illustrates another exemplary vertical display having an editing interface.

Once an editing mode is elected, further options for the editing mode may be displayed in the editing interface 600. FIG. 7 illustrates another exemplary vertical display having an editing interface 600. The embodiment illustrated in FIG. 7 may be displayed after selecting the altitude constraint interface in FIG. 6. As seen in FIG. 7, radio buttons 700 representing AT, AA and AB have been generated by the processor 154. AT corresponds to an "At" command, requiring a selected altitude constraint to be exactly at the altitude selected by the user. AA and AB correspond to "at or above" and "at or below," respectively. While not illustrated in FIG. 7, a window option may also be presented to a user in the editing interface. The window option is a combination of the AA and AB constraints, which create a window a vehicle can operate within. Any secondary editing tool options displayed in the editing interface 600, however, depend upon the initial editing mode selected by the user.

Returning to FIG. 4, in one embodiment, for example, the movable reference lines 400 and 410 may include a variable visual characteristic. For example, the movable reference lines 400 and 410 may change color, pattern, or any combination thereof based upon the proximity of the reference line to an object in the restriction data. If the reference line were to overlap with a restriction in the restriction data the reference line may change, for example, to a red color, for example, to highlight the overlap and provide an even clearer display of the overlap. The reference line intelligence could have multiple levels, for example, a first color/pattern when the reference line is greater than a first distance away from the restriction, a second color/pattern when the reference line is less than the first distance but not overlapping the restriction, and a third color/pattern when the reference line is overlapping the restriction to provide a simple, but data rich interface for editing the flight plan of the vehicle 100.

Figure 8:
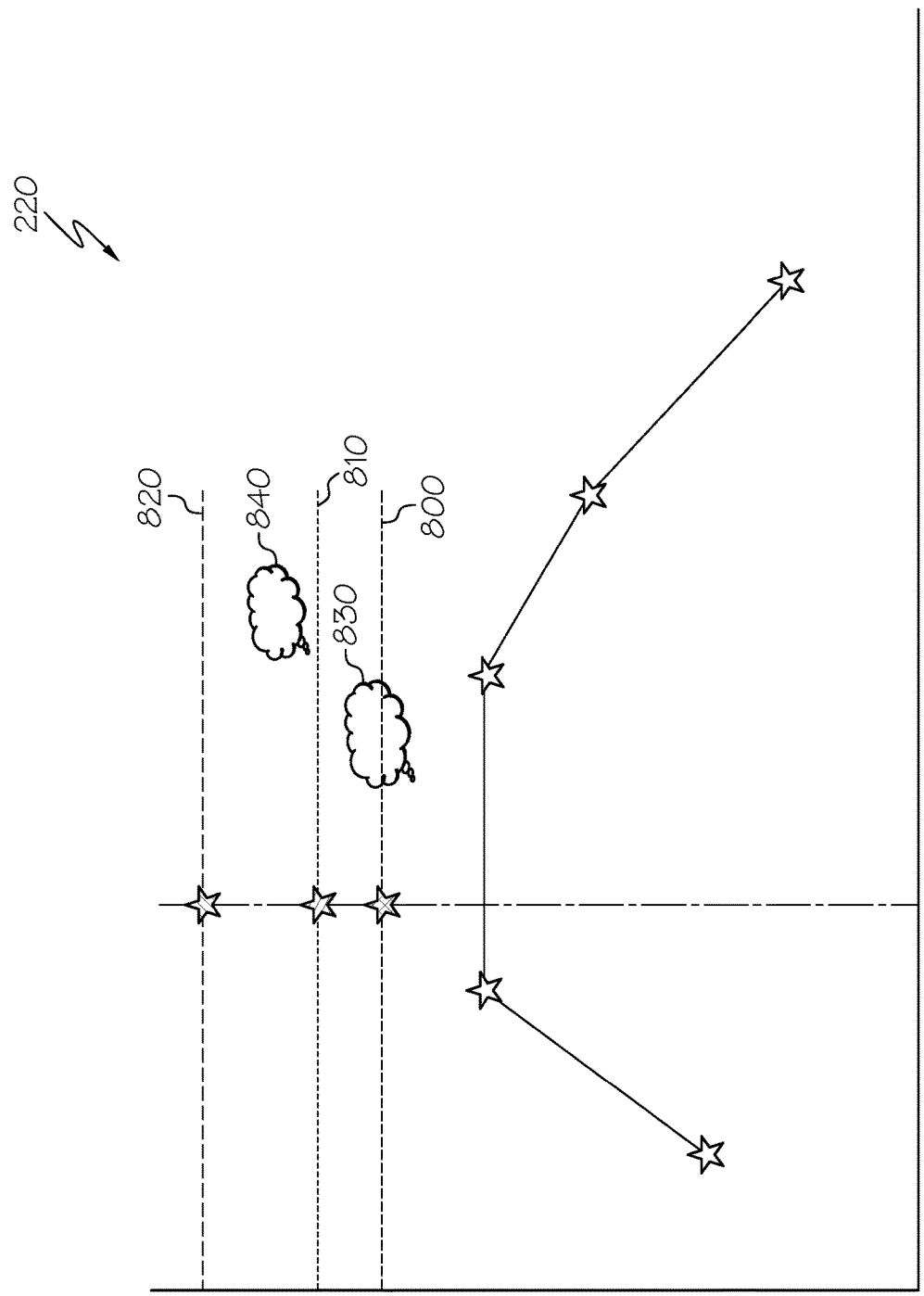
FIG. 8 illustrates a vertical display, in accordance with an embodiment.

FIG. 8 illustrates a vertical display 220, in accordance with an embodiment. As seen in FIG. 8, three movable references lines 800, 810 and 820 are displayed at three relative elevations with respect to multiple restrictions 830 and 840. Because of the restriction 830, the reference line 800 is displayed by the processor 154 in a first color or pattern as the reference line intersects the restriction 830 and indicates to the user of the vehicle 100 that the elevation associated with the reference line should be avoided. The processor 154 displays the reference line 810 in a second color or pattern as the reference line 810 is close to, but not overlapping, the restriction 840 which indicates that the user's should be cautious with selecting the elevation associated therewith. The processor 154 displays the reference line 820 in a third color or pattern because the reference line is well clear of the restriction 840.

Figure 9:
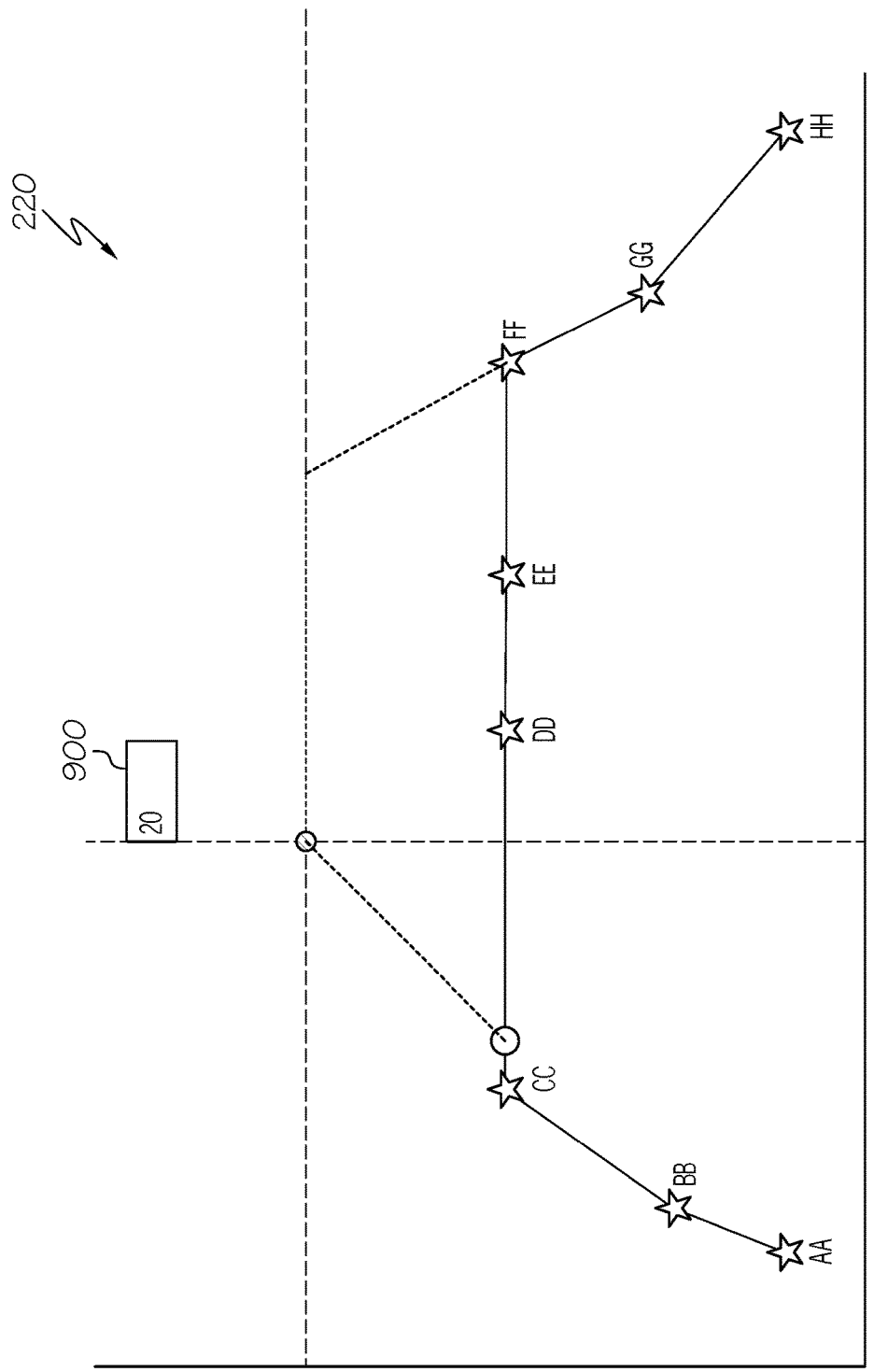
FIG. 9 illustrates an exemplary vertical display in accordance with an embodiment.

The processor 154 may also generate a change in variable interface associated with one of the movable reference lines 400 or 410. FIG. 9 illustrates an exemplary vertical display 220 in accordance with an embodiment. As seen in FIG. 9 a change in variable interface 900 has been generated and associated with the reference line 410. In this embodiment, reference line 410 is associated with distance along the horizontal axis. Accordingly, the variable in the change in variable interface 900 in this example is distance. However, the change in variable interface 900 could also be associated with altitude or time, depending upon the reference data associated with the respective axis. The change in variable interface 900 shows a difference in the variable between the currently selected location associated with the reference line and the value associated with the immediately preceding waypoint. In this example, there is a distance of twenty nautical miles between the location of the reference line 410 and the immediately preceding waypoint CC. The display of the tentative trajectory in FIG. 9, based on the touch point, would help the crew to visualize the flight plan change in relative to the restrictions.

Returning to FIG. 4, the editing tools may further include a scroll 420 and a scroll 430. As seen in FIG. 4, the scroll 420 corresponds with the reference line 400 and the scroll 430 corresponds with the reference line 410. The scrolls 420 and 430 include a scroll wheel 425 and 435, respectively. The scroll wheel 425 and 435 can be rotated by a user via the input system 158 to move the reference lines 400 and 410 within the vertical display 220. The scrolls 420 and 430 further include numbering corresponding to elevation in scroll 420 and nautical distance for scroll 430. In scroll 420, for example, the number 22 refers to 22000 feet and the numbers twelve, thirteen and fourteen refer to one hundred twenty, one hundred thirty and one hundred forty, respectively. Accordingly, a user can accurately set the elevation for a new waypoint to a specific altitude by rotating the scrolls to the desired altitude. When the scrolls 420 or 430 are rotated, the corresponding reference line also moves to show where the corresponding elevation or distance corresponds on the vertical display 220. Accordingly, the scrolls 420 and 430 may provide a more fine-tuned interface for selecting a particular altitude or distance without requiring the user the type in specific numbers.

As seen in FIG. 4, an operational restriction 440 indicating, for example, a maximum altitude for the vehicle 100 may be displayed by the processor 154. The operational restriction 440 provides a visual representation of a limit of the vehicle 100 that a user should not exceed. In one embodiment, for example, the processor 154 may not let a user select a value, in this example an altitude, which exceeds the operational restriction 440. In other words, the scrolls 420 or 430 and the movable reference lines 400 and 410 may not be able to pass through the operational restriction 440. This operational restriction is sometimes dynamically computed by FMS 110 based on a state of the vehicle 110.

Returning to FIG. 3, after the processor 154 has generated the editing tools, the processor may receives a command to change the flight plan from the user, which may be transmitted to the FMS 110 for further processing. (Step 350). The additional processing can vary between the commands, as discussed in further detail below.

One possible command is a Step Up command which enters a new way point into the flight plan of the vehicle. As seen in FIG. 4, a Step Up command can be entered by the user by selecting the altitude and location for the Step Up command using the editing tools generated by the processor and selecting the confirm input interface 450. In other words, the new way point is located at the intersection of the movable reference lines 400 and 410 which a user can manipulate by moving the lines themselves or by moving the scroll wheels 425 or 435 to select the new way point. Once the processor 154 receives the command, the processor 154 transmits the command to the FMS 110 as discussed above. As only the end point for the Step Up command is entered by the user, the FMS 110 calculates a start point for the maneuver and generates a tentative new flight plan. Once the FMS 110 processes the received flight command and generates an updated flight plan, the FMS 110 transmits the updated flight to the processor 154 of the situation display 150.

Figure 10:
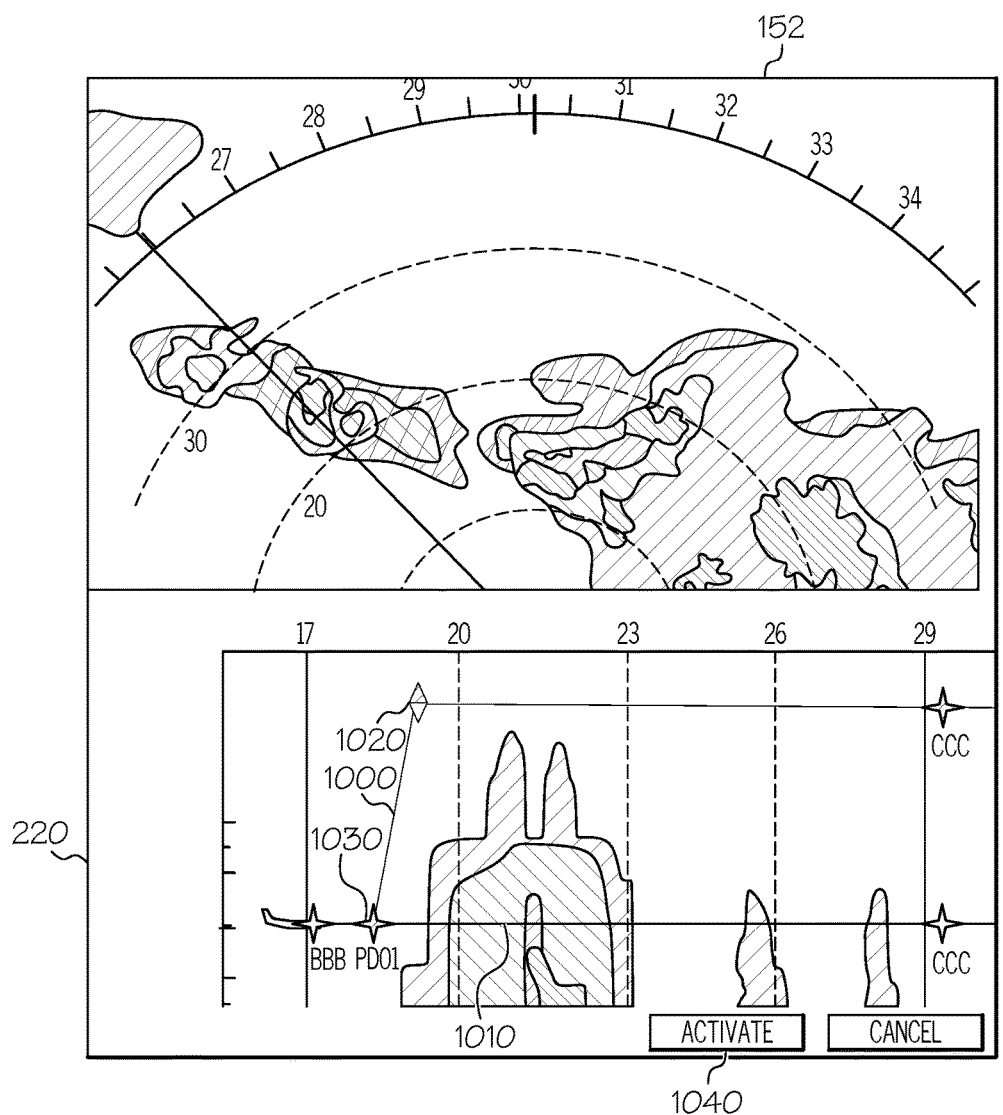
FIG. 10 illustrates another exemplary display of the situation display system 150.

Returning to FIG. 3, the processor 154 of the situation display 150 then displays the updated flight plan and the original flight plan on the display 152. (Step 360). FIG. 10 illustrates another exemplary display 152 of the situation display system 150. As seen in FIG. 10 an updated flight plan 1000 bypassing the weather system and the original flight plan 1010 are displayed on the display 152 of the situation display 150. The updated flight plan 1000 includes the waypoint 1020 selected by the user and the waypoint 1030 generated by the FMS 110 as the start point for the departure from the original flight plan 1010 to the updated flight plan 1000. As with the display 152 in FIG. 4, the display 152 in FIG. 10 includes the restriction such that the user can easily visually verify that the updated flight plan 500 avoids the restriction.

Figure 11:
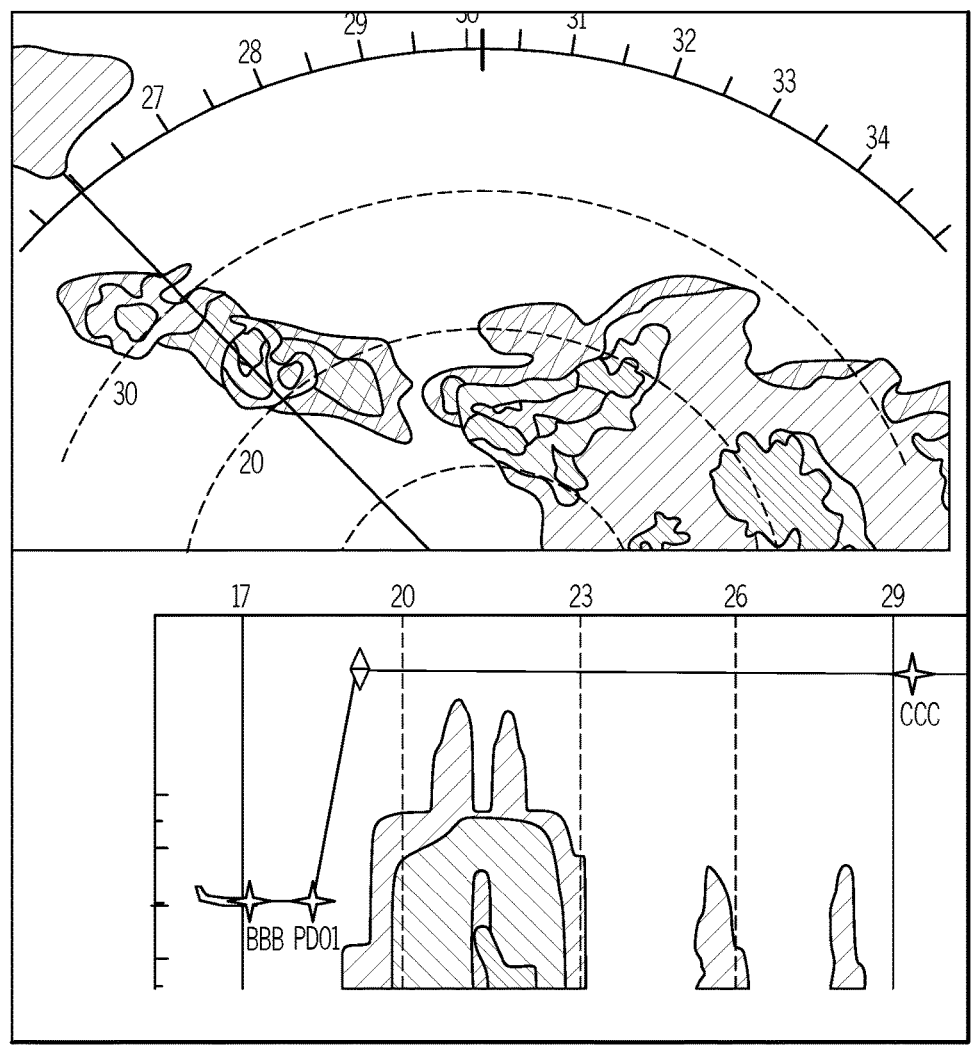
FIG. 11 illustrates another exemplary display of the situation display system 150.

Returning to FIG. 3, the processor 154 of the situation display 150 then receives approval from the user for the new flight plan, transmits the approval to the FMS 110 causing the FMS 110 to activate the new flight plan. (Step 370). As seen in FIG. 10, for example, the processor 154 may generate an activate interface 1040. A user of the situation display 150 can activate the new flight plan by, for example, touching the activate interface when the input system 158 is a touchscreen, or by using any other input system 158 in the vehicle 100. Once the processor 154 received the activation request, the processor 154 transmits the activation request to the FMS 110 to alter the flight plan of the vehicle 100 and displays the new flight plan on the vertical display 220 of the situation display 150, as illustrated in FIG. 11.

Figure 12:
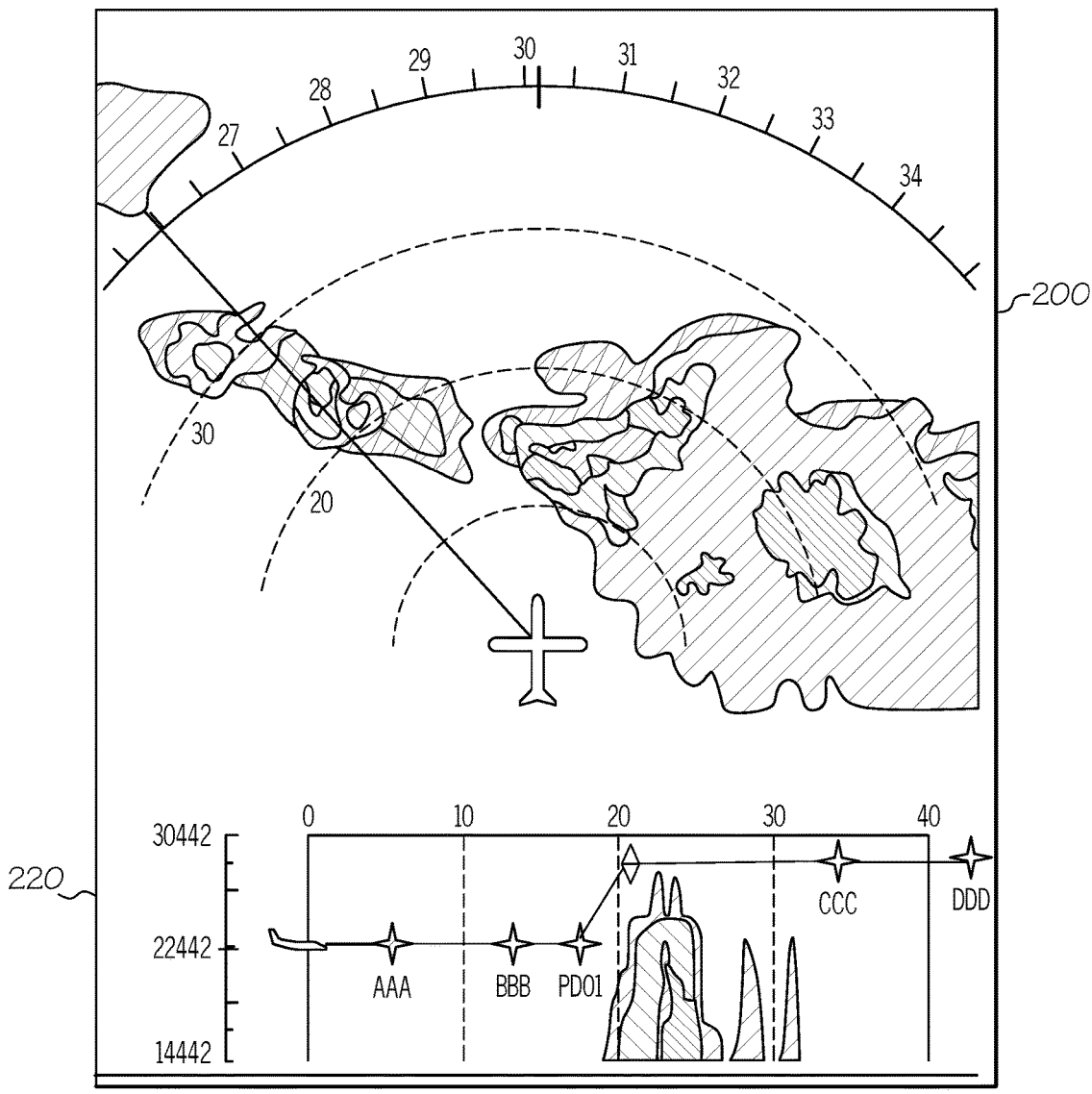
FIG. 12 illustrates an exemplary display of the situation display after the updated flight plan is activated.
Figure 13:
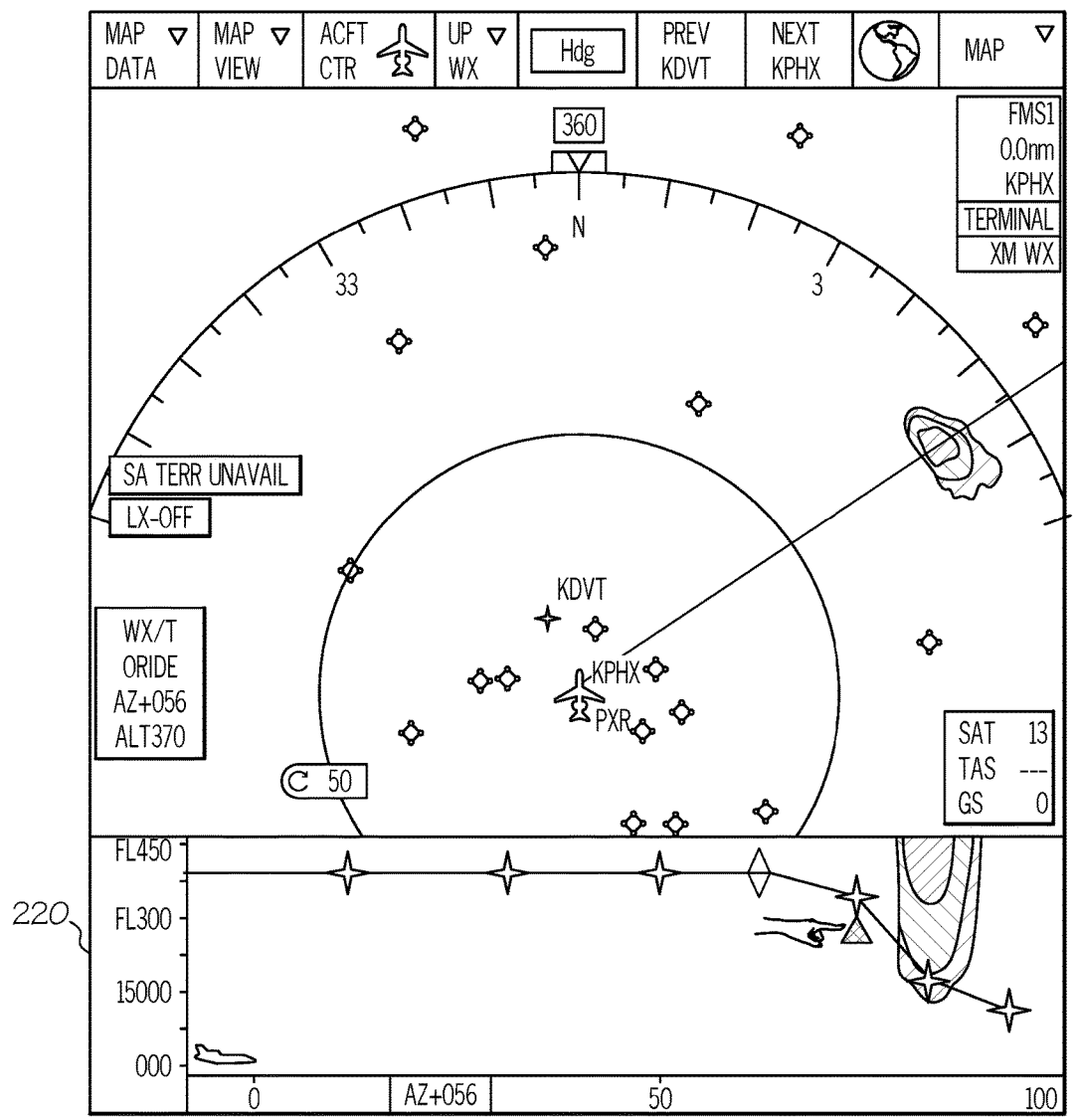
FIGS. 13-16 illustrate how the situation display may be used to revise an existing altitude constraint, in accordance with an embodiment.

Returning to FIG. 3, once the activation request is received and the updated flight plan activated, the vertical display 220 of the situation display 150 is shrunk to return to its original size. FIG. 12 illustrates an exemplary display of the situation display 150 after the updated flight plan is activated. As seen in FIG. 12, the updated flight plan 1000 is illustrated on the vertical display 220 of the situation display 150. However, the size of the vertical display is 220 illustrated in FIG. 7 is the same size as the vertical display 220 illustrated in FIG. 2. Accordingly, once a user is done editing the flight plan of the vehicle, the situation display 150 returns to its original size and standard functionality.

Figure 14:
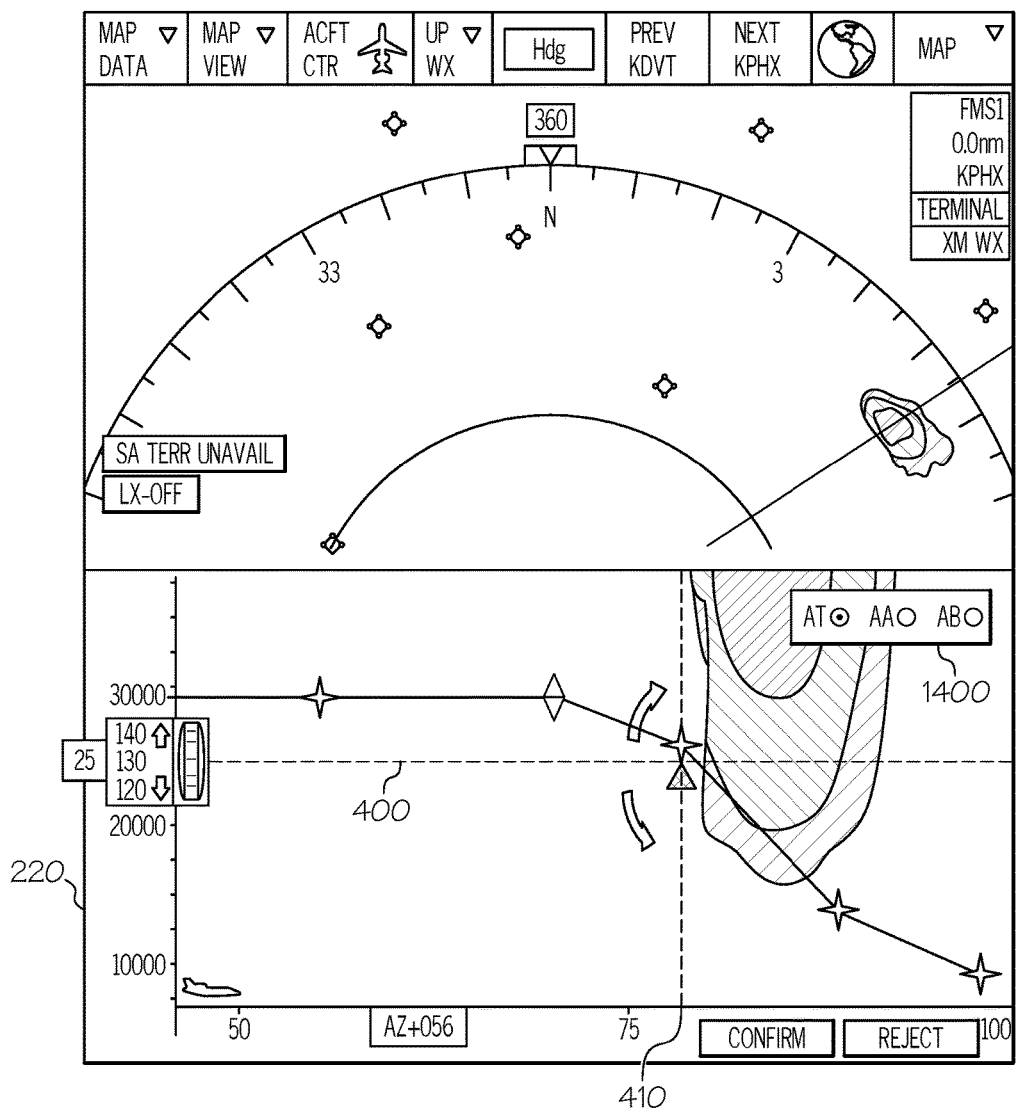
Figure 15:
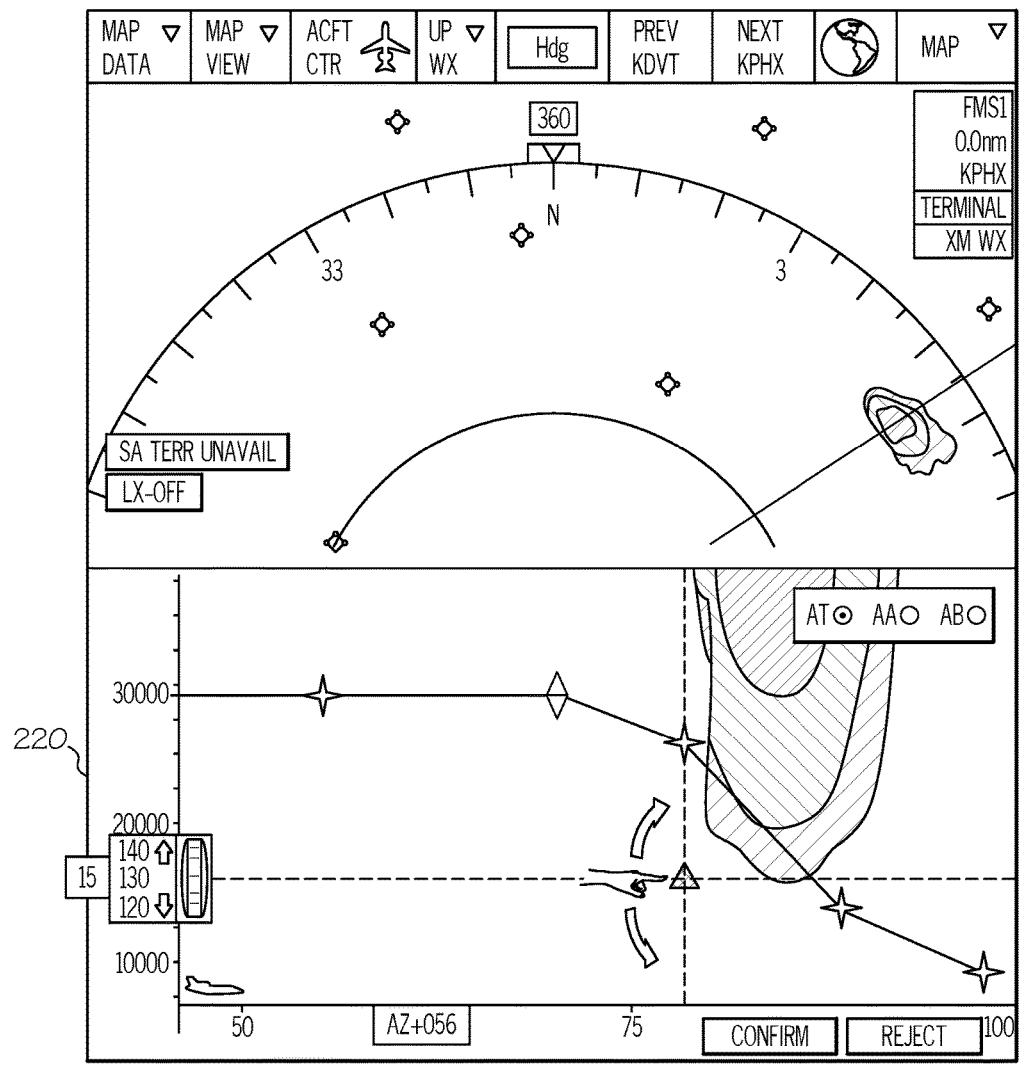
Figure 16:
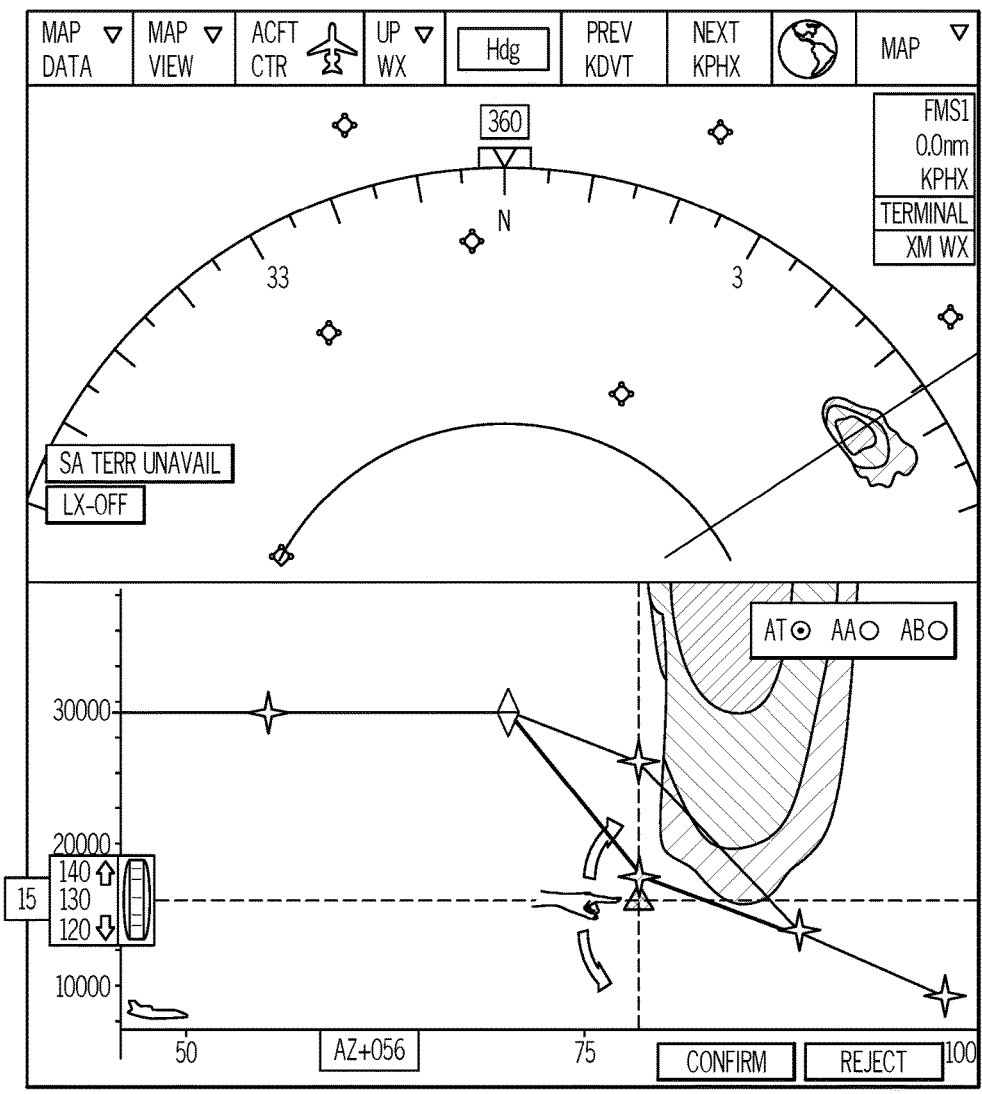

As discussed above, the situation display 150 can also be used to revise an existing altitude constraint. FIGS. 13-16 illustrate how the situation display may be used to revise an existing altitude constraint, in accordance with an embodiment. A request to edit an existing altitude constraint (i.e., Step 320), may be received through the input system 158 by selecting one of the existing altitude constraints in the existing flight plan. For example, when the input system 158 is a touch screen, the user may request to revise an existing altitude constraint by touching the respective altitude constraint icon on the vertical display 220. As seen in FIG. 14, the vertical display 220 is expanded and the editing tools are regenerated by the processor 154. (Steps 330 and 340). As discussed above, additional editing tool related to the selected editing mode may be regenerated. As seen in FIG. 14, radio buttons 1400 representing, for example, AT, AA and AB are generated. When a user selects AA or AB, the FMS 110 may modify the altitude selected by the user such that the updated flight plan does not conflict/intersect with the restrictions. The user may then drag and drop the reference lines 400 and 410, rotate the one or more scrolls 420 and 430, or otherwise use the input system 158 to request a new altitude constraint, as illustrated in FIG. 15. Once the user requests the selected new altitude constraint via the confirm interface, the processor 154 transmits the new altitude constraint to the FMS 110 along with the selected AT, AA or AB command. (Step 350). The FMS calculates an updated flight plan based upon the new altitude constraint request and the selected AT, AA or AB command, and transmits the updated flight plan to the processor 154 of the situation display 150 for display on the vertical display 220 as illustrated in FIG. 16. (Step 360). The user can then confirm the updated flight plan in a similar manner as discussed above.

Figure 17:
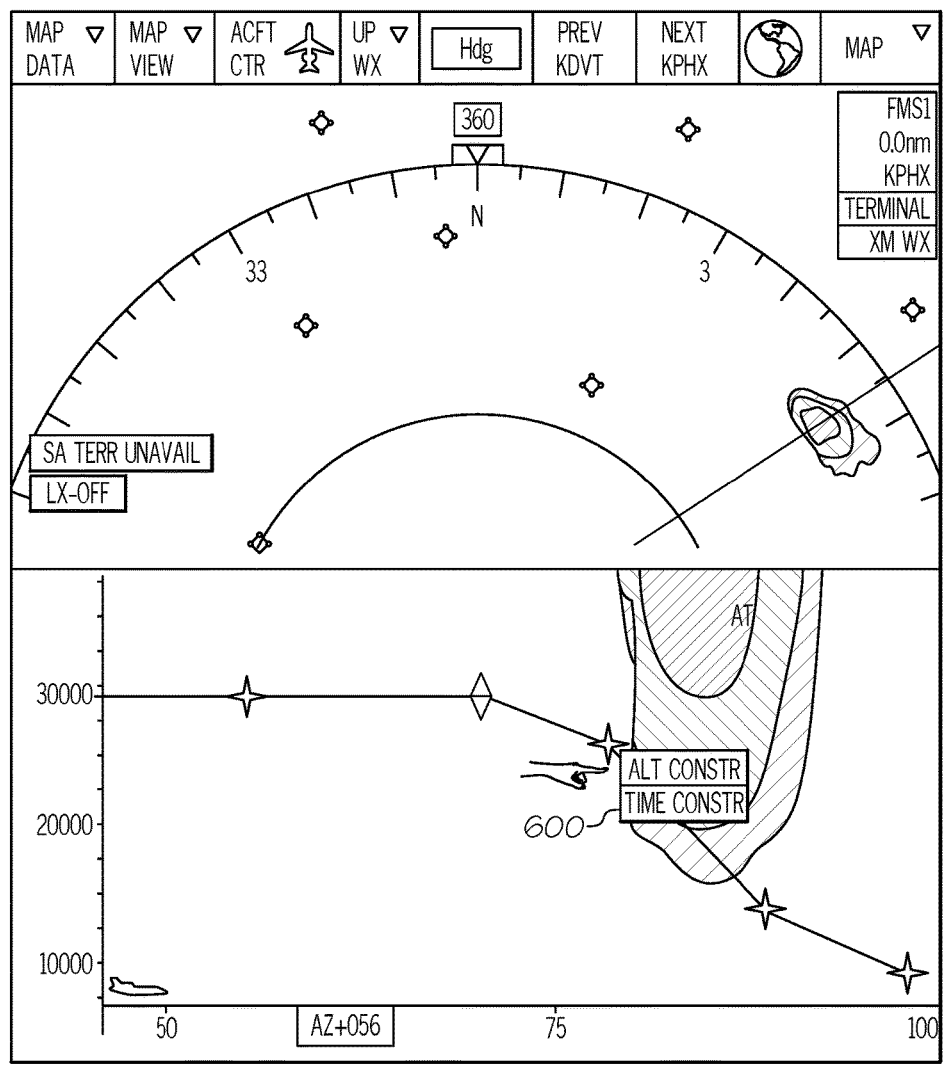
FIGS. 17-19 illustrate how the situation display may be used to insert a new altitude constraint.
Figure 18:
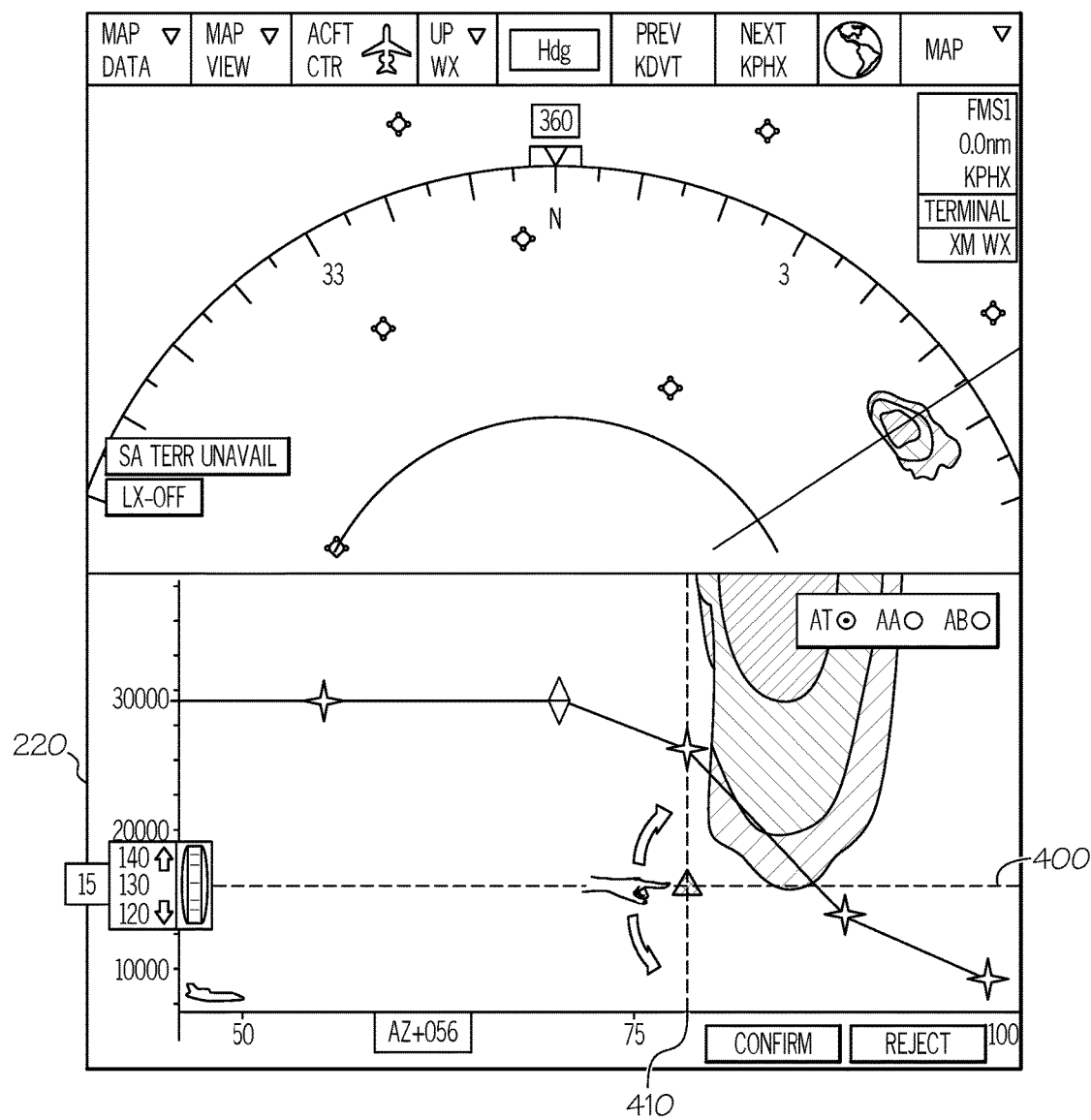
Figure 19:
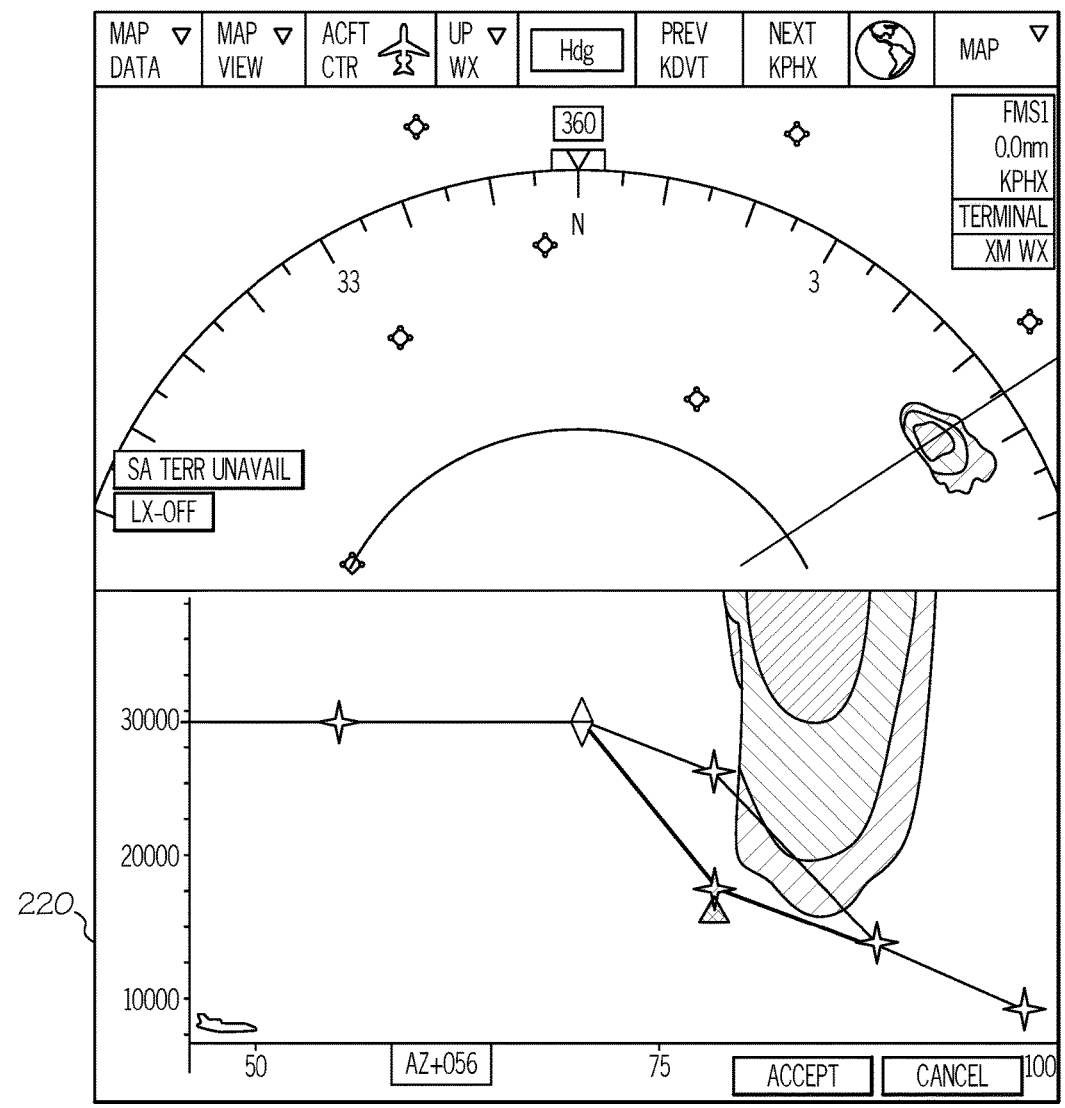

As discussed above, the situation display 150 can also be used to insert a new altitude constraint. FIGS. 17-19 illustrate how the situation display may be used to insert a new altitude constraint. As seen in FIG. 17, an editing interface 600 displays options within the vertical display 220 when the insert new altitude constraint editing mode is selected. As seen in FIGS. 18 and 19 the processor 154, after receiving a selection of the altitude constraint option from the editing interface 600 illustrated in FIG. 17, generates the editing tools allowing the user to select and insert the new altitude constraint in a similar fashion as discussed above.

Figure 20:
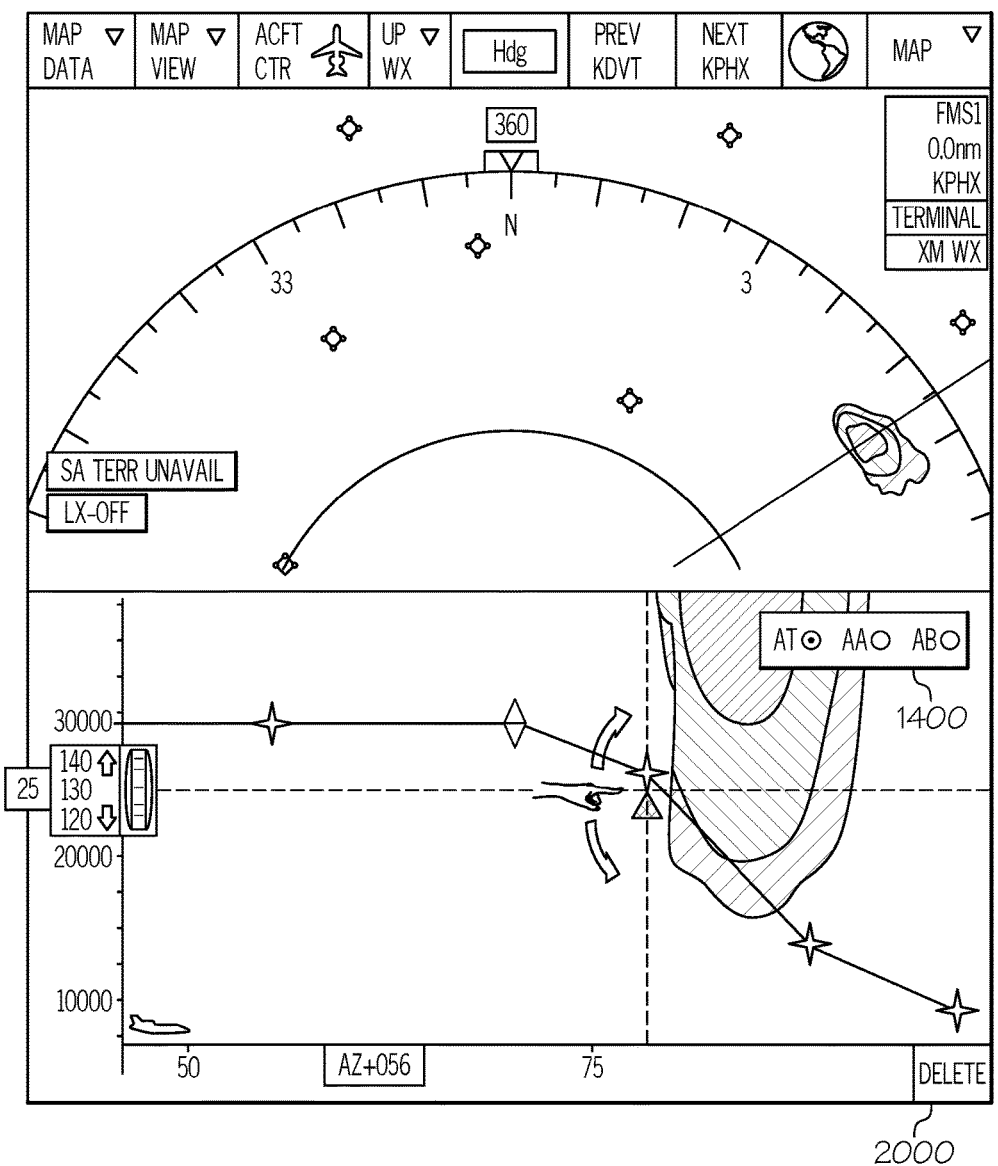
FIGS. 20 and 21 illustrate how a waypoint, such as n altitude constraint, can be deleted with the situation display system, in accordance with an embodiment.
Figure 21:
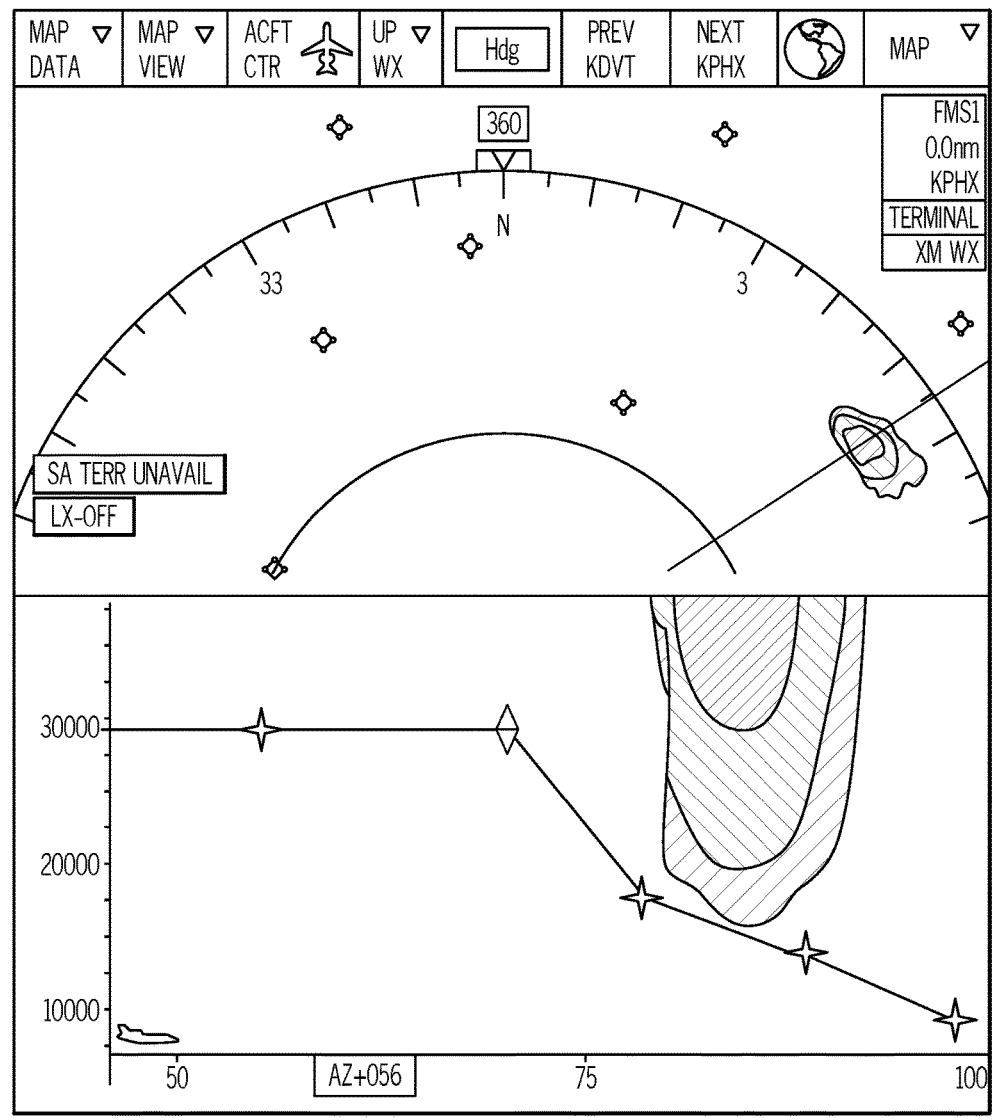

FIGS. 20 and 21 illustrate how a waypoint, such as an altitude constraint, can be deleted with the situation display system 150, in accordance with an embodiment. As seen in FIG. 20, a delete interface 2000 on the vertical display may be generated by the processor 154 when the user selects a waypoint similar to how an editing interface 600 is generated when a user selects a waypoint. A user can delete the waypoint by, for example, by selecting the waypoint using the input system 158 and then selecting delete interface 2000 or by dragging a selected waypoint to the delete interface 2000. When the processor 154 receives the deletion request from the user, the processor 154 sends the updated plan (i.e., the existing flight plan without the selected altitude constraint), to the FMS 110 for processing (Step 350). The FMS 110 then generates a new flight plan and transmits the new flight plan back to the situation display system 150 for display, as illustrated in FIG. 21.

Figure 22:
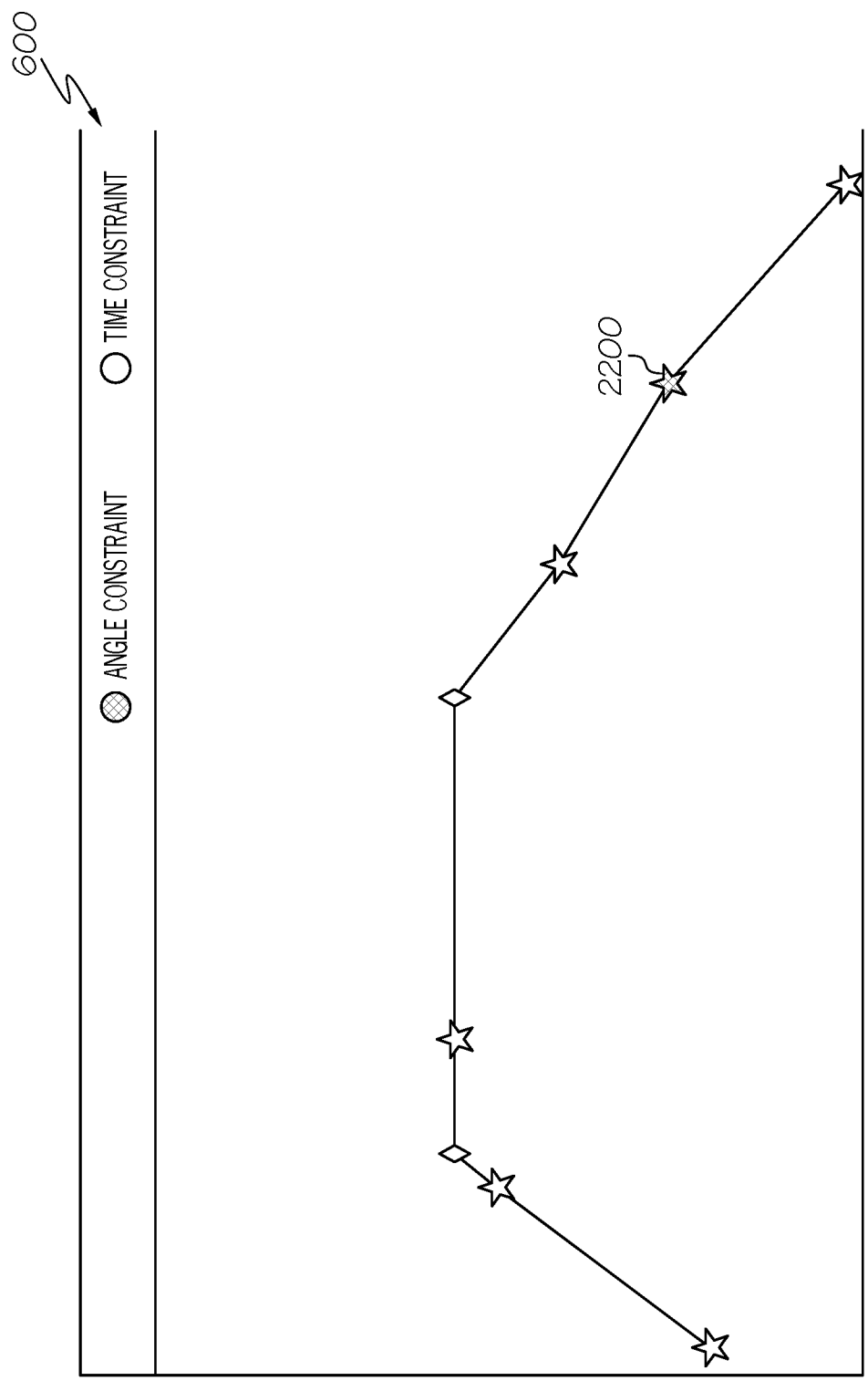
FIGS. 22-24 illustrate how the situation display may be used to insert a new angle constraint.
Figure 23:
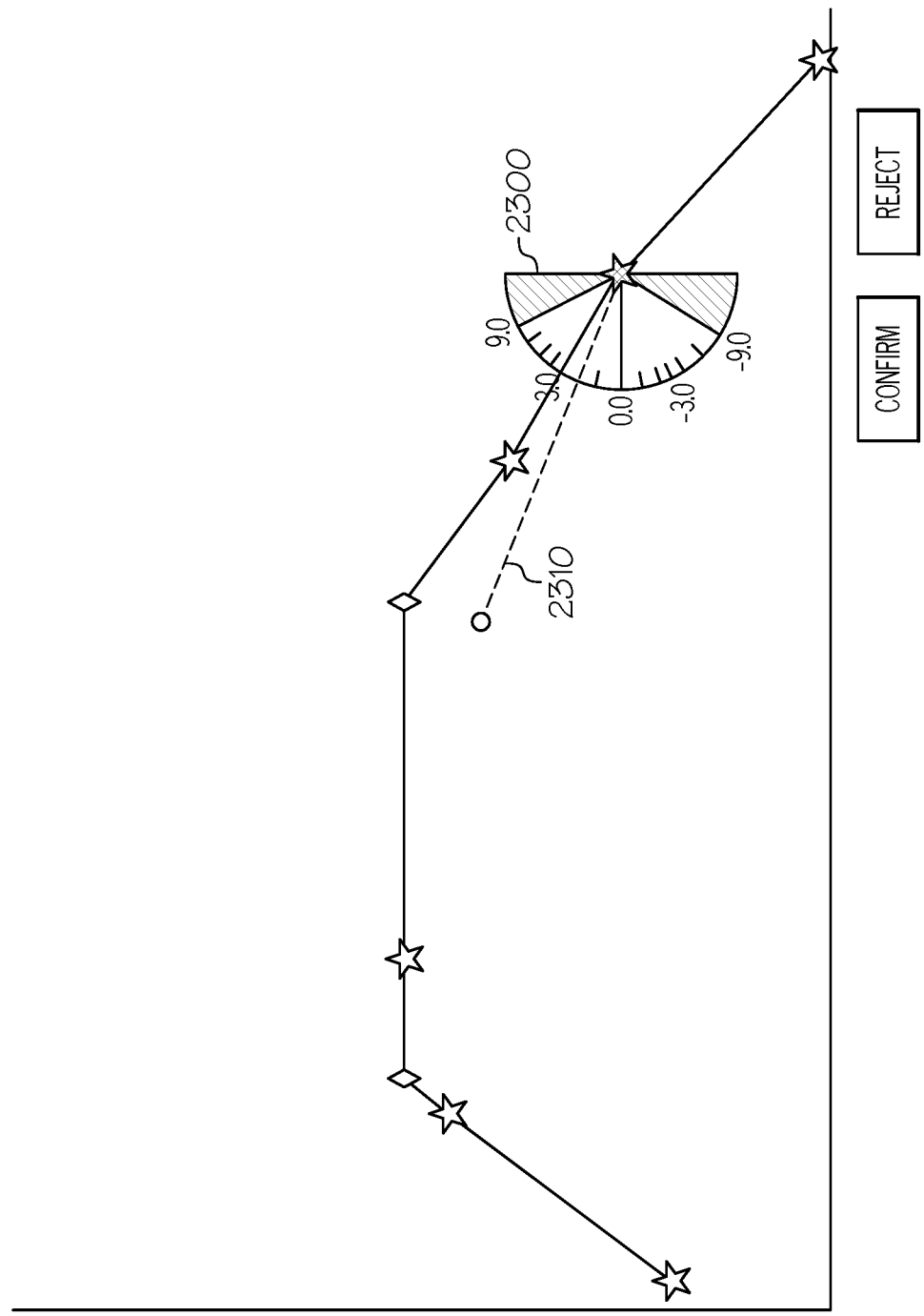
Figure 24:
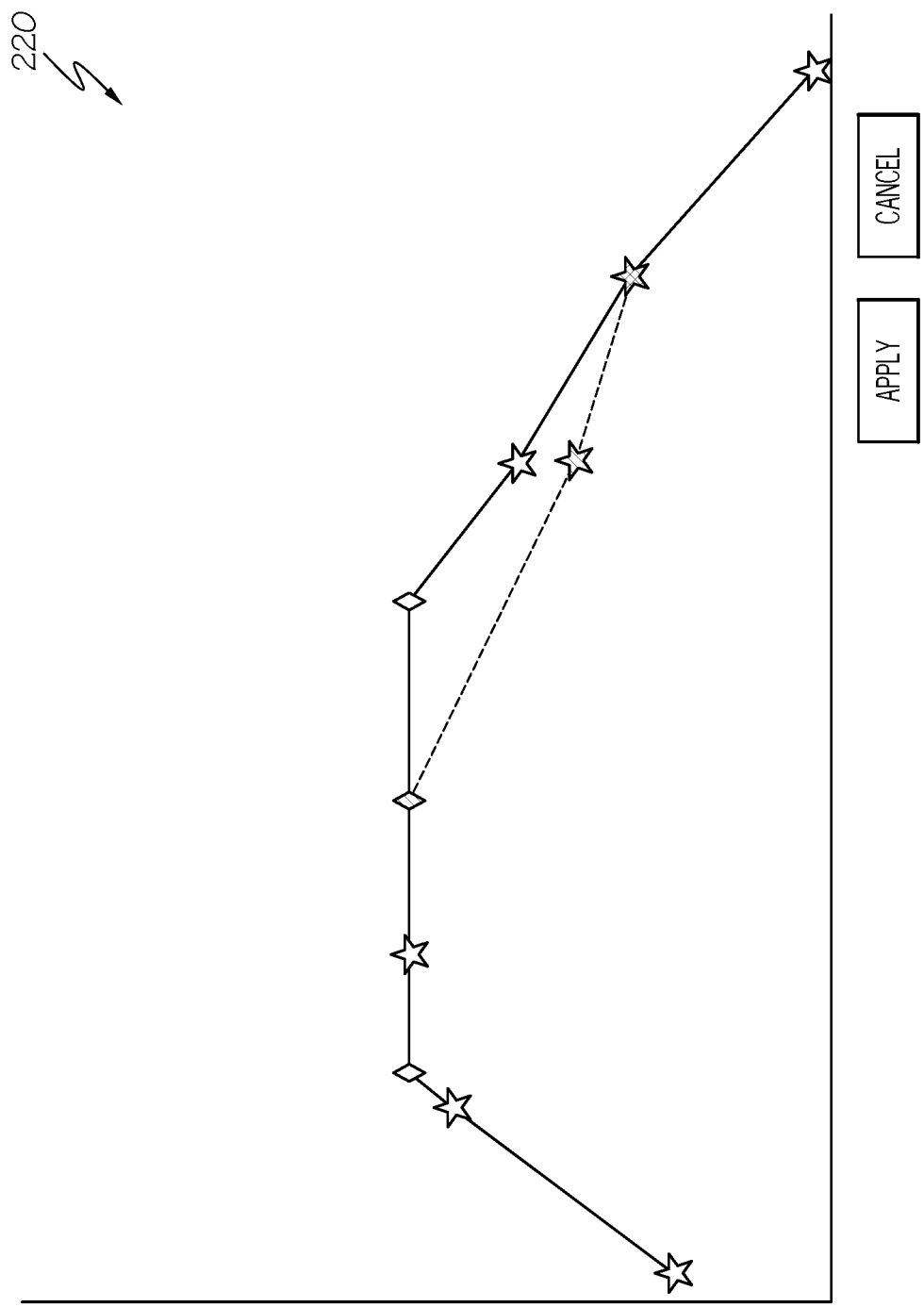

FIGS. 22-24 illustrate how the situation display may be used to insert a new angle constraint. As seen in FIG. 22, when a user selects a waypoint 2200 in a decent phase, the editing interface 600 displays an option for an angle constraint. As seen in FIG. 23, the processor 154 generates a compass editing tool 2300 at the selected waypoint and a movable reference line 2310. The movable reference line 2310 can be rotated about a center point of the compass editing tool 2300 centered at the selected waypoint. When the user confirms the desired angle, the processor 154 transmits the selected angle to the FMS 110 and the FMS 110 recalculates the vertical profile of the flight plan based upon the selected angle. As seen in FIG. 24, a preview of the updated flight plan utilizing then new angle constraint is displayed with the original flight plan for reference and perspective.

Figure 25:
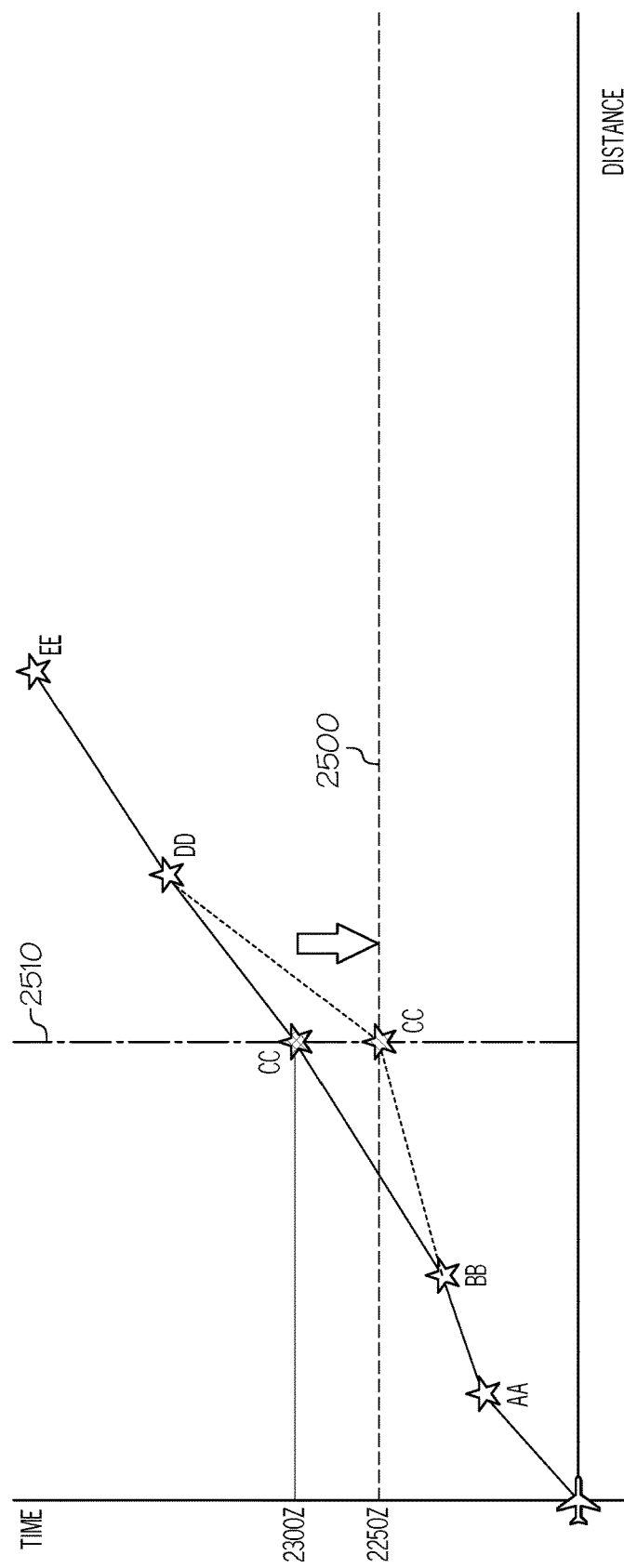
FIG. 25 illustrates how the situation display may be used to insert a new time constraint, in accordance with an embodiment.

FIG. 25 illustrates how the situation display may be used to insert a new time constraint, in accordance with an embodiment. In the vertical display 220 in FIG. 25, the vertical axis is changed from an altitude axis to a time axis when a user selects a time constraint editing mode in a user interface 600 (not illustrated in FIG. 25). By utilizing the reference lines 2500 and 2510 a user can select a corresponding time and distance for a new waypoint, or to modify an existing waypoint as illustrated in FIG. 25, associated with a new time constraint. Time alerts waypoints can be added or modified in a similar manner.

Figure 26:
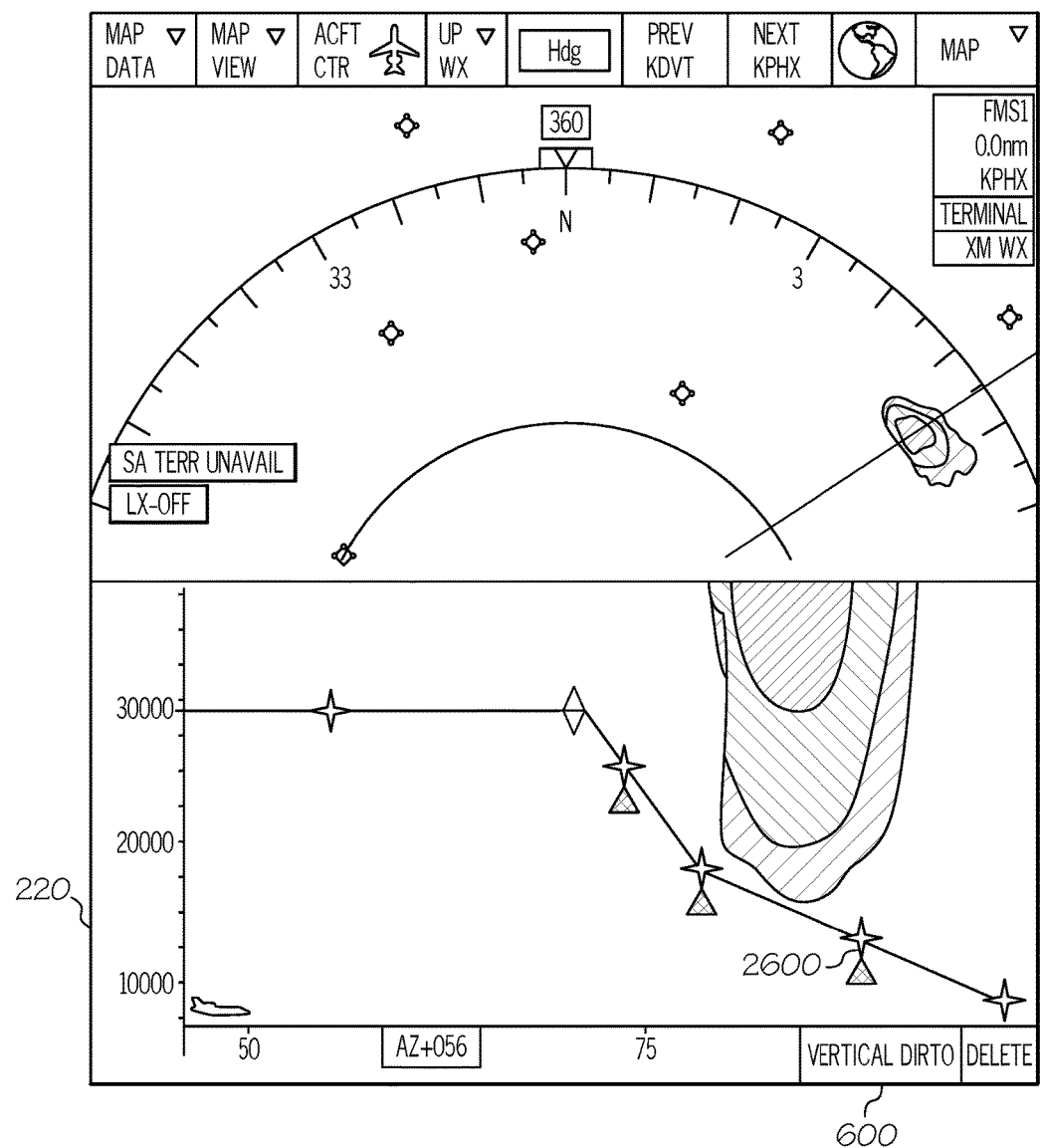
FIGS. 26-28 illustrate how a "vertical direct to" command can be with the situation display system, in accordance with an embodiment.
Figure 27:
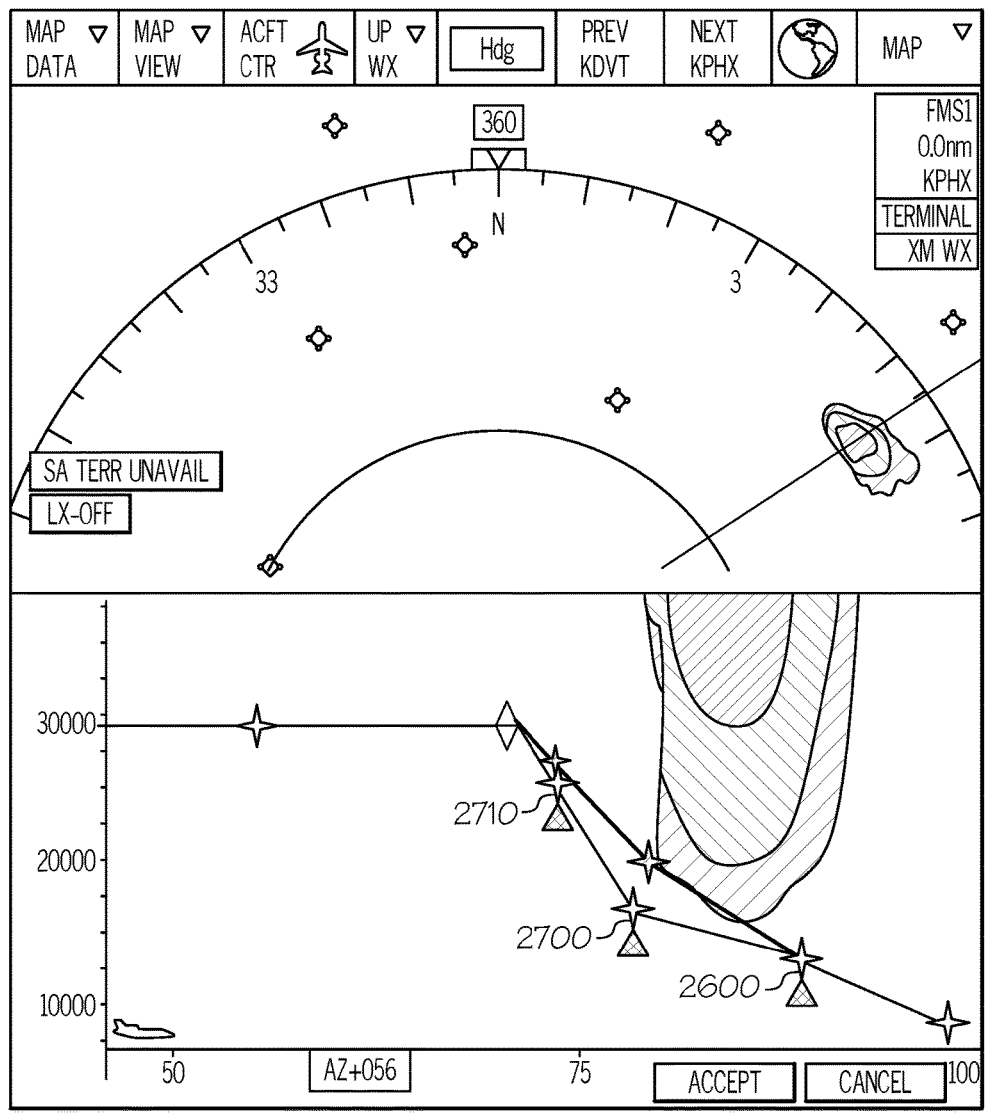
Figure 28:
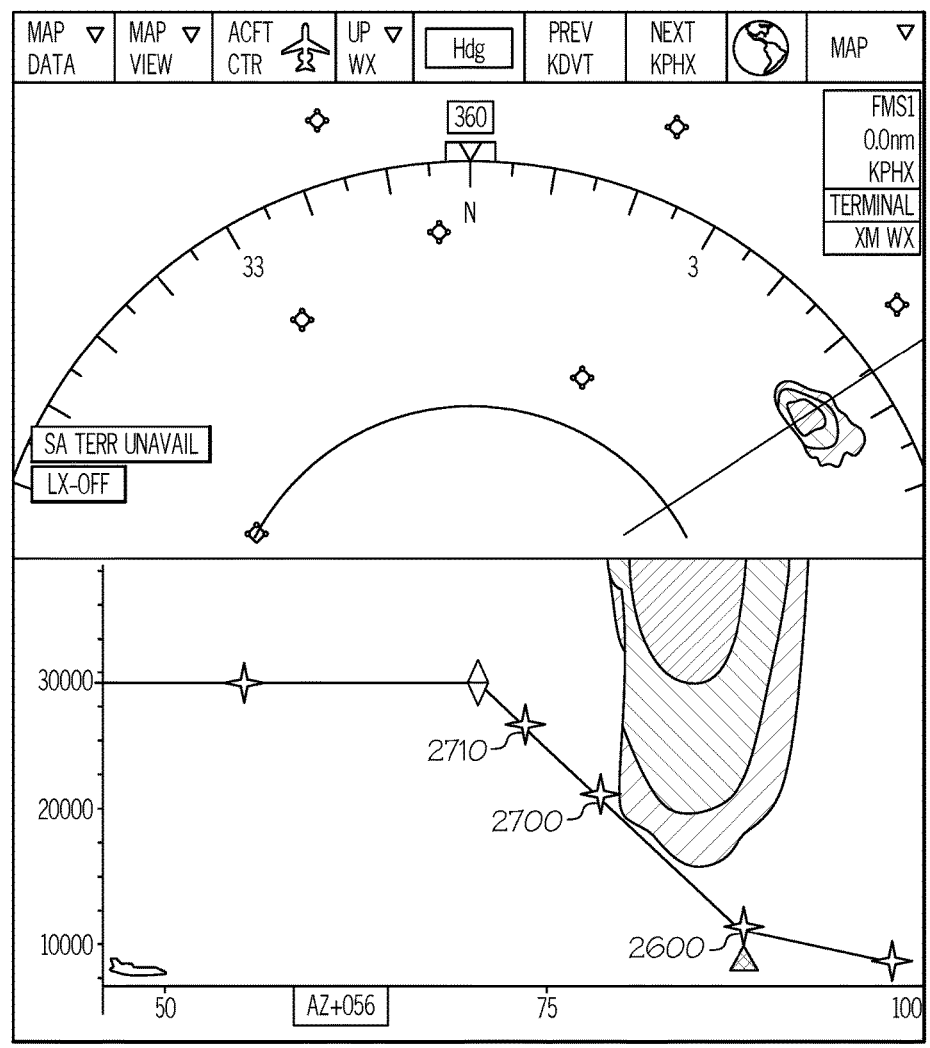

FIGS. 26-28 illustrate how a "vertical direct to" command can be with the situation display system 150, in accordance with an embodiment. As seen in FIG. 26, when a waypoint during a climb or decent, such as waypoint 2600, is selected, an editing interface 600 brings up a vertical direct to editing option. Upon selection of the vertical direct to editing option, the processor 154 identifies the waypoints associated with the selected waypoint. As seen in FIG. 27, the waypoints 2700 and 2710, which are also associated with the decent up till the selected waypoint 2600, are identified by the processor 154. As seen in FIG. 28, when the user accepts the vertical direct to command, the waypoints 2700 and 2710 are modified such that the vehicle directly descends to the selected waypoint 2600, and the FMS 110 updates the vertical profile of the flight plan as seen in FIG. 28.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft, comprising:
    a flight management system configured to control a flight plan of the vehicle;
    a sensor configured to output restriction data;
    a vertical situation display communicatively coupled to the flight management system and the sensor, the vertical situation display configured to display the flight plan controlled by the flight management system relative to altitude and distance and the restriction data from the sensor relative to altitude, the vertical situation display comprising a processor; and a vertical situation display user interface communicatively coupled to the vertical situation display, wherein the vertical situation display user interface is dialogless and comprises at least one of a touch screen interface and a cursor interface;

wherein the processor of the vertical situation display is configured to:

receive, from the vertical situation display user interface, a request to change the flight plan;

expand the vertical situation display in a vertical direction and zoom into a position within the vertical situation display upon receiving the request;

generate at least one movable reference line on the expanded vertical situation display, the movable reference line extending to a scale of the vertical situation display, the movable reference line being movable to enter a command to change the flight plan of the aircraft, the movable reference line comprising at least one characteristic reflective of an restriction interaction when the aircraft would intersect with the restriction;

receive, from the vertical situation display user interface, the command to change the flight plan based upon a movement of one of the movable reference line, the change including at least one of a vertical step command, a vertical direct to command, a revision to an existing altitude constraint of the flight plan command, a new altitude constraint command, a deletion of an altitude constraint command, a flight path angle constraint command, a flight level change command, a time constraint command and a speed constraint command;

generate a preview of the updated flight plan display data for the vertical situation display, the generated preview of the updated flight plan display data displaying an updated flight plan relative to a current flight plan from the flight management system and the restriction data from the sensor;

receive, from the vertical situation display user interface, approval of the displayed updated flight plan; and transmit the approval of the displayed updated flight plan to the flight management system, the flight management system configured to update the flight plan of the vehicle based upon the command to change the flight plan, wherein the processor is further configured to generate a rotatable scroll corresponding to each movable reference line, each rotatable scroll comprising a wheel causing the corresponding reference line to move when rotated, a first numbering interface corresponding to one of a distance or altitude in units of thousands and a second numbering interface corresponding to one of a distance or altitude in units of hundreds.

2. The aircraft of claim 1, wherein the processor is -further configured to receive from the vertical situation display user interface a selection to delete a waypoint, the waypoint associated with at least one of altitude constraint, speed constraint, time constraint, altitude marker, time marker.

3. The aircraft of claim 1, wherein the characteristic is a color change when the aircraft would intersect with the restriction at a reference value corresponding to the movable reference line.

4. The aircraft of claim 1, wherein the characteristic is a pattern change when the aircraft would intersect with the restriction at a reference value corresponding to the movable reference line.

5. The aircraft of claim 1, wherein the received command to change the flight plan includes a waypoint located at an intersection of two movable reference lines.

6. The aircraft of claim 1, wherein the received command includes a constraint type corresponding to the one or more movable reference lines, the constraint type includes one of a AT constraint, an AT or ABOVE constraint, an AT or BELOW constraint and a WINDOW constraint.

7. A situation display for an aircraft, comprising:

a user interface;

a display; and a processor communicatively coupled to the user interface and the display, the processor configured to:

receive, from a sensor, restriction data;

receive, from a flight management system, flight plan data;

generate lateral profile display data on a first portion of the display based upon the restriction data a lateral profile of the flight plan data;

generate vertical profile display data on a second portion of the display based upon the restriction data a vertical profile of the flight plan data;

receive, from the user interface, a request to edit a vertical profile of the flight plan;

expand the vertical profile display data into the first portion of the display;

generate a first movable reference line, the first movable reference line movable via input to the user interface, the first movable reference line corresponding to one of an altitude, a distance and a time and extending along the vertical profile display data to a scale, the first movable reference line comprising at least one visual characteristic which changes based when the first movable reference line overlaps an restriction of the restriction data;

generate a rotatable scroll corresponding to each movable reference line, each rotatable scroll comprising a wheel causing the corresponding reference line to move when rotated, a first numbering interface corresponding to one of a distance or altitude in units of thousands and a second numbering interface corresponding to one of a distance or altitude in units of hundreds;

receive, from the user interface, a flight plan change request to change an altitude, distance or time of the flight plan, the altitude, distance or time corresponding to the first movable reference line;

generate a preview of an updated flight plan based upon the flight plan change request, the generated preview of the updated flight plan displaying the updated flight plan relative to a current flight plan from the flight management system and the restriction data from the sensor;

receive, from the user interface, approval of the displayed updated flight plan; and transmit the approval of the displayed updated flight plan to the flight management system, the flight management system configured to update the flight plan of the aircraft based upon the command to change the flight plan.

8. The situation display of claim 7, wherein the at least one visual characteristic is a color change when the aircraft would intersect with the restriction at a reference value corresponding to the first movable reference line.

9. The situation display of claim 7, wherein the at least one visual characteristic is a pattern change when the aircraft would intersect with the restriction at a reference value corresponding to the first movable reference line.

10. The situation display of claim 7, wherein the processor is further configured to generate a second movable reference line, the second movable reference line corresponding to another of an altitude, distance or time.

11. The situation display of claim 10, wherein the flight plan change request includes a distance from the vehicle at which to change an altitude of the flight plan corresponding to where the second movable reference line crosses and the first movable reference line.

12. The situation display of claim 7, wherein the processor is further configure to generate a compass associated with a waypoint and a second movable reference line associated with the compass, the second movable reference line altering an angle constraint associated with the waypoint.

13. A method for operating a vertical situation display, comprising:
   receiving, by a processor, restriction data from a sensor;
   receiving, by the processor, flight plan data from a flight management system;
   generating, by the processor, lateral profile display data on a first portion of a display based upon the restriction data a lateral profile of the flight plan data;
   generating, by the processor, vertical profile display data on a second portion of the display based upon the restriction data a vertical profile of the flight plan data;
   receiving, by the processor, a request to edit a vertical profile of the flight plan from a user interface associated with the vertical situation display;
   expanding, by the processor, the vertical profile display data into the first portion of the display;
   generating, by the processor, a first movable reference line, the first movable reference line movable via input to the user interface, the first movable reference line corresponding to an altitude and extending along the vertical profile display data to an altitude scale, the first movable reference line comprising at least one visual characteristic which changes based when the first movable reference line overlaps an restriction of the restriction data;
   generating, by the processor, a rotatable scroll corresponding to each movable reference line, each rotatable scroll comprising a wheel causing the corresponding reference line to move when rotated, a first numbering interface corresponding to the altitude in units of thousands and a second numbering interface corresponding the altitude in units of hundreds;
   receiving, by the processor, a flight plan change request to change an altitude of the flight plan from the user interface, the altitude corresponding to the altitude of the first movable reference line;
   generating, by the processor, a preview of an updated flight plan based upon the flight plan change request, the generated preview of the updated flight plan displaying the updated flight plan relative to a current flight plan from the flight management system and the restriction data from the sensor;
   receiving, by the processor approval of the displayed updated flight plan from the user interface; and
   transmitting, by the processor, the approval of the displayed updated flight plan to the flight management system, the flight management system configured to update the flight plan of the aircraft based upon the command to change the flight plan.

14. The method of claim 13, wherein the at least one visual characteristic is a color change when the aircraft would intersect with the restriction at a reference value corresponding to the first movable reference line.

15. The method of claim 13, wherein the at least one visual characteristic is a pattern change when the aircraft would intersect with the restriction at a reference value corresponding to the first movable reference line.

16. The method of claim 13, further comprising generating a second movable reference line, the second movable reference line corresponding to a distance from the aircraft.

17. The method of claim 16, wherein the flight plan change request includes a distance from the vehicle at which to change an altitude of the flight plan corresponding to where the second movable reference line crosses and the first movable reference line.

\* \* \* \* \*